(12) United States Patent
Tanaka et al.

(10) Patent No.: US 6,212,955 B1
(45) Date of Patent: Apr. 10, 2001

(54) CAPACITANCE-TYPE PRESSURE SENSOR UNIT

(75) Inventors: Atsushi Tanaka; Yoshimitsu Motoki; Satoshi Nakao, all of Toyama (JP)

(73) Assignee: Hokuriku Electric Industry Co., Ltd., Toyama (JP)

( * ) Notice: Subject to any disclaimer, the term of this patent is extended or adjusted under 35 U.S.C. 154(b) by 0 days.

(21) Appl. No.: 09/367,180

(22) PCT Filed: Dec. 9, 1998

(86) PCT No.: PCT/JP98/05574

§ 371 Date: Aug. 9, 1999

§ 102(e) Date: Aug. 9, 1999

(87) PCT Pub. No.: WO99/30121

PCT Pub. Date: Jun. 17, 1999

(30) Foreign Application Priority Data

Dec. 9, 1997 (JP) ...................................... 9-338804
Dec. 9, 1997 (JP) ...................................... 9-338805

(51) Int. Cl.⁷ ................................ G01L 9/12; H01G 7/00

(52) U.S. Cl. ............................ 73/718; 73/724; 361/283.4

(58) Field of Search .............................. 73/715, 718, 753, 73/ 756, 723–727; 361/283.4

(56) References Cited

U.S. PATENT DOCUMENTS 5,656,780 * 8/1997 Park ....................................... 73/724

* cited by examiner

Primary Examiner—Benjamin R. Fuller
Assistant Examiner—Abdullahi Aw-Musse
(74) Attorney, Agent, or Firm—Rankin, Hill, Porter & Clark LLP

(57) ABSTRACT

A capacitance-type pressure sensor unit capable of being assembled without applying a pressure at an increased level to a circuit board. A connector body (6) has a base (6b) received in a peripheral wall section (13b) of a receiving casing (13) constituting a main body of the casing (13) and fixed to an end (13e) of the peripheral wall section (13b) by caulking. A pressure sensor element (3) constituted of a first insulating substrate (1) and a second insulating substrate (2) is arranged in a bottom wall section (13a) of the receiving casing (13) and a fluid chamber (15) into which pressure measured fluid is introduced is defined between a rear surface of the first insulating substrate (1) and the bottom wall section (13a). A circuit board (9) received in a circuit component receiving chamber (7) defined in the base (6b) of the connector body (6) is supported by connection conductors (8) for connection of a connector (5), metal terminal fitments (19) for electrically connecting output electrodes (2c) of the pressure sensor element (3) to a circuit board (9) and a ground terminal fitment (22) for electrically connecting a ground electrode of the circuit board (9) to the receiving casing (13) while being suspended in the chamber (7).

20 Claims, 12 Drawing Sheets

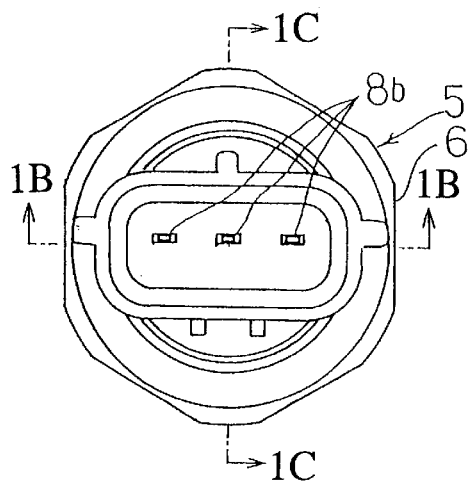
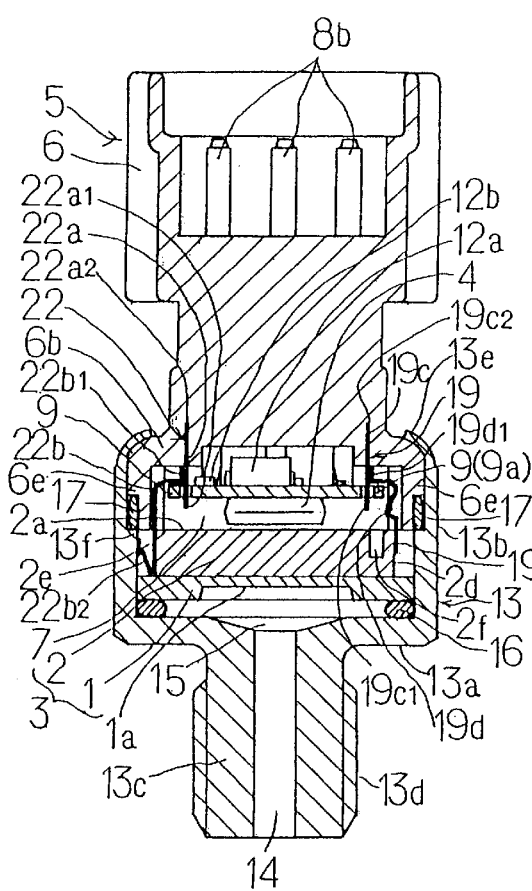
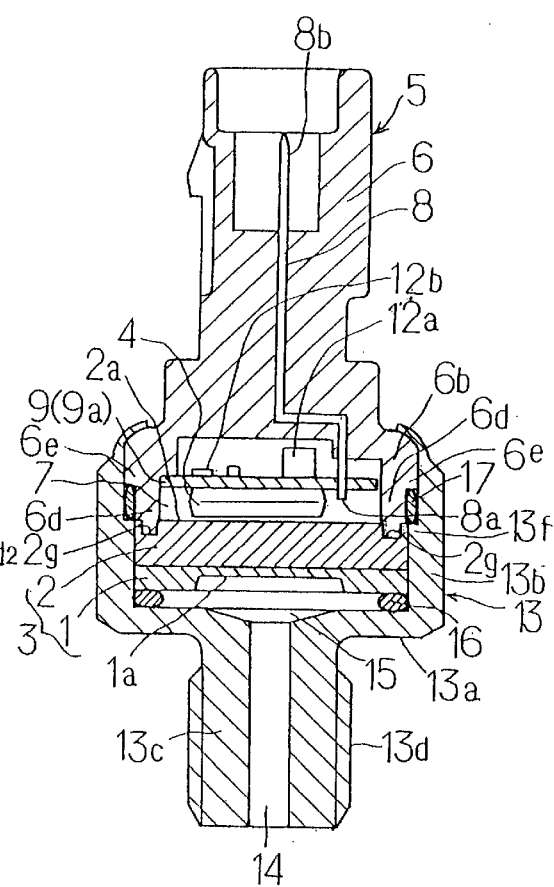

CAPACITANCE-TYPE PRESSURE SENSOR UNIT

TECHNICAL FIELD

This invention relates to a capacitance-type pressure sensor unit adapted to measure a pressure based on a variation in capacitance.

BACKGROUND ART

First of all, a conventional capacitance-type pressure sensor unit which is to be improved by the present invention will be described with reference to FIG. 14.

The capacitance-type pressure sensor unit shown in FIG. 14 includes a first insulating substrate 1 having a front surface formed thereon with an electrode (not shown) and a rear surface acting as a pressure sensing surface 1a and a second insulating substrate 2 combined with the first insulating substrate 1 to constitute a pressure sensor element 3. The second insulating substrate 2 has a rear surface provided thereon with an electrode (not shown) in a manner to be opposite to the electrode on the first insulating substrate 1 while being spaced therefrom at a predetermined interval and a front surface 2a provided thereon with a first circuit pattern (not shown). The first circuit pattern is electrically connected to the two above-described electrodes arranged in the pressure sensor element 3. The second insulating substrate 2 is mounted thereon with at least one electric circuit component 4 by soldering. The electric circuit component 4 is constituted by an integrated circuit or the like and electrically connected to the first circuit pattern to carry out processing of an output of the pressure sensor element 3.

The capacitance-type pressure sensor unit also includes a connector 5 arranged on a side of the front surface 2a of the second insulating substrate 2. The connector 5 includes a connector body or connector housing 6, which includes a base 6b having an end surface 6a kept contacted with the front surface 2a of the second insulating substrate 2 of the pressure sensor element 3 and provided therein with a circuit component receiving chamber 7 in which the electric circuit component 4 is received. Also, the connector 5 includes a plurality of connection conductors or connector terminals 8 which are supported in the connector body 6 and of which one end is arranged in the circuit component receiving chamber 7 and the other end is externally exposed.

The circuit component receiving chamber 7 of the connector 5 has a circuit board 9 arranged therein in a manner to be spaced at an interval from the front surface 2a of the second insulating substrate 2. The circuit board 9 is arranged in a manner to be interposedly supported between an annular support 10 made of an electrically insulating material and arranged on an outer peripheral edge of the front surface of the second insulating substrate 2a and a step 6c formed on an inner periphery of the base 6b of the connector body 6. The circuit board 9 is provided thereon with a second circuit pattern (not shown), which is electrically connected to the first circuit pattern on the front surface 2a of the second insulating substrate 2 and the connection conductors 8 of the connector 5. Connection between the connection conductors 8 and the second circuit pattern on the circuit board 9 is carried out by inserting one end 8a of each of the connection conductors 8 via each of through-holes formed via the circuit board 9 and soldering the end to a soldering electrode arranged on a rear surface of the circuit board 9. The circuit board 9 and the first circuit pattern on the front surface 2a of the second insulating substrate 2 are electrically connected to each other through electrical connection means 11 such as a flexible printed board or the like. The circuit board 9 thus connected is mounted thereon with electric circuit components 12a and 12b such as capacitors or the like for removing noise intruding thereinto through the other end 8b of each of the connection conductors 8 of the connector 5 by soldering.

The pressure sensor element 3, the circuit board 9, the base 6b of the connector body 6 and the like are received in a receiving casing 13 made of metal. The receiving casing 13 includes a bottom wall section 13a formed with a fluid inlet port 14 through which pressure measured fluid such as gas, liquid or the like of which a pressure is to be measured is introduced into the capacitance-type pressure sensor unit of the illustrated embodiment. The receiving casing 13 also includes a peripheral wall section 13b connected at one end thereof to the bottom wall section 13a, a cylindrical section 13c mounted on a central portion of the bottom wall section 13a so as to surround the fluid inlet port 14 and a threaded section 13d formed on an outer periphery of a distal end of the cylindrical section 13c. The pressure sensor element 3 is received in the peripheral wall section 13b of the receiving casing 13 in such a manner that the pressure sensing surface 1a is arranged opposite to the bottom wall section 13a and so as not to define a large gap between the pressure sensing surface 1a and the peripheral wall section 13b. The pressure sensing surface 1a of the pressure sensor element 3 and the bottom wall section 13a are arranged so as to define a fluid chamber 15 therebetween into which the pressure measured fluid is introduced. The peripheral wall section 13b has a seal member 16 arranged on a portion of an inner periphery thereof positioned between the pressure sensing surface 1a and the bottom wall section 13a. The seal member 16 is constituted by an O-ring for sealing the fluid chamber 15. Also, a seal member 17 is interposedly arranged between the base 6b of the connector body 6 and the peripheral section 13b of the receiving casing 13. The seal member 17 is constituted by an O-ring supported in a groove formed on an outer periphery of the base 6b. The connector 5 is fixed on the receiving casing 13 by holding the base 6a of the connector body 6 in an upper end section 13e of the receiving casing 13 by caulking.

In the conventional capacitance-type pressure sensor unit thus constructed, when pressure measured fluid such as gas, liquid or the like is introduced through the fluid inlet port 14 into the fluid chamber 15, a pressure of the fluid acts on the pressure sensing surface 1a of the first insulating substrate 1 of the pressure sensor element 3. Action of the pressure on the surface 1a permits a variation in capacitance between the electrodes arranged opposite to each other in the pressure sensor element 3. Such a variation in capacitance is converted into a voltage signal by a signal processing circuit constituted of the electronic circuit component 4 or the like. The voltage signal thus obtained is then outwardly transmitted through the connector 5.

DISCLOSURE OF INVENTION

In the conventional capacitance-type pressure sensor unit constructed as described above, the circuit board 9 is interposedly arranged between the support 10 and the step 6c provided on the inner periphery of the base 6b of the connector body 6. The support 10 is supported on the front surface 2a of the second insulating substrate 2 of the pressure sensor element 3 and the pressure sensor element 3 is supported through the O-ring 16 on the bottom wall 13a of the receiving casing 13. Such construction of the conventional capacitance-type pressure sensor unit tends to cause a pressure of an increased magnitude to be applied to the circuit board when the base 6b of the connector body 6 is mounted in the end 6d of the receiving casing 13 by caulking. Such application of an increased pressure to the circuit board may possibly cause damage to the circuit board.

Also, the conventional capacitance-type pressure sensor unit is so constructed that electrical connection between the circuit board 9 and the first circuit pattern on the front surface 2a of the second insulating substrate 2 is carried out using the electrical connection means 11 such as a flexible printed board or the like. Unfortunately, such electrical connection causes an increase in manufacturing cost of the unit.

Accordingly, it is an object of the present invention to provide a capacitance-type pressure sensor unit which is capable of being assembled without applying an increased pressure to a circuit board.

It is another object of the present invention to provide a capacitance-type pressure sensor unit which is capable of being simplified in structure and reduced in manufacturing cost.

In accordance with the present invention, a capacitance-type pressure sensor unit is provided which is constructed so as to solve the above-described problem of the prior art. The capacitance-type pressure sensor unit generally includes a capacitance-type pressure sensor element, a receiving casing, a circuit board and a connector. The capacitance-type pressure sensor element includes a first insulating substrate which is made of an insulating material and has a front surface provided thereon with a first capacitance detecting electrode pattern and a rear surface constituting a pressure sensing surface and a second insulating substrate which is made of an insulating material and fixed with respect to the first insulating substrate and has a rear surface provided thereon with a second capacitance detecting electrode pattern in a manner to be opposite to the first capacitance detecting electrode pattern while being spaced at an interval therefrom. The capacitance-type pressure sensor element functions to detect a variation in pressure acting on the pressure sensing surface of the first insulating substrate depending on a variation in capacitance between the first capacitance detecting electrode pattern and the second capacitance detecting electrode pattern.

The receiving casing is made of metal and includes a cylindrical casing body provided at one end thereof with an opening and at the other end thereof with a bottom wall section. The bottom wall section is provided with a fluid inlet port through which a pressure measured fluid is introduced into the receiving casing.

The circuit board includes a board member provided thereon with circuit patterns and mounted thereon with at least a part of a plurality of electric circuit components constituting a signal processing circuit for processing an output of the pressure sensor element.

The connector includes a connector body which is made of an insulating material and includes a base formed on one surface thereof with an opening and provided therein with a circuit component receiving chamber for receiving the circuit board therein in a manner to communicate with the opening of the connector body. The connector also includes a plurality of connection conductors fixed in the connector body and each having one end extending into the circuit component receiving chamber and electrically connected to each of the circuit patterns on the circuit board and the other end externally exposed.

The circuit board has a component mounting surface arranged so as to extend along a front surface of the second insulating substrate of the pressure sensor element. More specifically, the pressure sensor element is received in the casing body of the receiving casing so that a fluid chamber which fluid introduced through the fluid inlet port enters is defined between the pressure sensing surface of the first insulating substrate and the bottom wall section of the receiving casing.

The connector body is received in the casing body of the receiving casing in such a manner that the base of the connector body is positioned on a side of the opening of the receiving casing rather than on a side of the pressure sensor element. More specifically, the connector body is received in the casing body of the receiving casing in such a manner that the base of the connector body is kept contacted at an end thereof on a side of the opening of the base with the front surface of the second insulating substrate of the pressure sensor element. The receiving casing is securely mounted at an end thereof positioned on a side of the opening of the connector body on the base of the connector body by caulking. The pressure sensor element and the circuit patterns on the circuit board are electrically connected to each other through a plurality of metal terminal fitments.

In the present invention, the circuit board is supported by at least one of the connection conductors of the connector and the metal terminal fitments. Such construction prevents application of a pressure at an increase level to the circuit board as encountered with the prior art during caulking of the receiving casing. Also, the above-described electrical connection between the pressure sensor element and the circuit patterns on the circuit board by means of a plurality of the metal terminal fitments permits electrical connection between the pressure sensor element and the circuit patterns to be positively carried out even when the circuit board is kept suspended in the circuit component receiving chamber. In particular, when the circuit board is supported by at least the connection conductors of the connector and metal terminal fitments, assembling of the pressure sensor unit is attained without applying a pressure at an increased level to the circuit board while more firmly supporting the circuit board.

In a preferred embodiment of the present invention, the circuit patterns include a ground electrode connected to the receiving casing. When the ground electrode and receiving casing are electrically connected to each other through a ground terminal fitment made of metal, the ground terminal fitment is arranged so as to support the circuit board. Such construction permits ground connection between the ground electrode of the circuit patterns and the receiving casing to be facilitated by means of the ground terminal fitments. Also, the ground terminal fitment supports the circuit board, so that the circuit board may be suspendedly supported in the circuit component receiving chamber with increased stability.

In a preferred embodiment of the present invention, the metal terminal fitments each include a first section having one end connected to the electrode included in the circuit patterns of the circuit board by soldering and the other end fixed to a portion of a wall of the connector body which surrounds the circuit component receiving chamber and is opposite to the circuit board, as well as a second section having one end formed integrally with the first section and the other end connected to each of output electrodes of the pressure sensor element by soldering. The second section is preferably formed at a portion thereof between the one end thereof and the other end thereof into a shape which permits the second section to exhibit elasticity. The ground terminal fitment thus constructed permits the one end of the first section to be connected to the electrode incorporated in the circuit patterns on the circuit board by soldering and the other end thereof to be fixed on the wall of the connector body which surrounds the circuit board receiving chamber while being opposite to the circuit substrate. Also, the second section is integrated through the one end thereof with the first section and contacted at the other end thereof with the inner surface of the receiving casing. Further, when the second section is formed at a portion thereof between the one end thereof and the other end thereof into a shape which permits the second section to exhibit elasticity, the elasticity permits the other end of the second section to be stably electrically contacted with the inner surface of the receiving casing, so that assembling of the pressure sensor unit may be attained while keeping undue force from being applied to the connection between the one end of the first section and the electrode on the circuit board, resulting in eliminating a failure in contact.

Also, in a preferred embodiment of the present invention, the first insulating substrate of the pressure sensor element is formed into a contour of a substantially circular shape in plan and the second insulating substrate of the pressure sensor element is formed on a side wall section thereof with a flat section on which a plurality of output electrodes are arranged. Also, the second insulating substrate of the pressure sensor element is formed at a portion of the side wall section thereof opposite to the flat section with a recess in which the other end of the ground terminal fitment is fitted. Thus, when the first insulating substrate of the pressure sensor element is formed into a contour of a substantially circular shape in plan, sealing between the first insulating substrate and the casing body of the receiving casing in the fluid chamber between the pressure sensing surface of the first insulating casing and the bottom wall section of the receiving casing is facilitated. Also, the construction that the second insulating substrate of the pressure sensor element is formed on the side wall section thereof with the flat section on which a plurality of the output electrodes are arranged permits arrangement of a plurality of the output electrodes to be facilitated. Further, when the second insulating substrate of the pressure sensor element is formed at a portion of the side wall section thereof opposite to the flat section with the recess in which the other end of the ground terminal fitment is fitted, the other end of the ground terminal fitment may be contacted with the inner surface of the receiving casing through the recess. Thus, the other end of the ground terminal fitment may be formed into any desired length without adversely affecting the pressure sensor unit.

In addition, in a preferred embodiment of the present invention, the casing body of the receiving casing is formed on an inner surface thereof with an annular casing-side step and the base of the connector body is formed on an outer periphery thereof with an annular connector-side step, wherein the annular casing-side step and connector-side step have a waterproof O-ring arranged therebetween while keeping the O-ring compressed. Such construction effectively prevents leakage of fluid from the inner surface of the casing body and the outer periphery of the base of the connector body.

In a preferred embodiment of the present invention, the end of the connector body is integrally provided with two or more projections and the front surface of the second insulating substrate is formed with two or more recesses in which the projections are fitted. This permits relative positioning between the connector body and the second insulating substrate of the pressure sensor to be positively accomplished.

Also, in accordance with the present invention, a capacitance-type pressure sensor unit is provided. The pressure sensor unit generally includes a pressure sensor element, a connector, a circuit board and a receiving casing. The pressure sensor element includes a first insulating substrate having a front surface provided thereon with an electrode and a rear surface acting as a pressure sensing surface and a second insulating substrate which has a rear surface provided thereon with an electrode in a manner to be opposite to the electrode on the first insulating substrate while being spaced at a predetermined interval therefrom and is combined with the first insulating substrate. A plurality of output electrodes are arranged on one of a front surface of the second insulating substrate and a side surface thereof and electrically connected to the electrodes. Arrangement of the output electrodes on the front surface of the second insulating substrate may be carried out by arranging a first circuit pattern on the front surface of the second insulating substrate and incorporating the output electrodes in the first circuit pattern. Also, at least one electric circuit component for processing an output of the pressure sensor element may be electrically connected to the first circuit pattern provided on the front surface of the second insulating substrate.

The connector includes a connector body which is made of an insulating resin material and includes a base having an end surface contacted with the front surface of the second insulating substrate of the pressure sensor element and provided therein with a circuit component receiving chamber for receiving the electric circuit component therein. The connector also includes a plurality of connection conductors supported in the connector body and each having one end positioned in the circuit component receiving chamber and the other end externally exposed.

The circuit board is arranged in the circuit component receiving chamber while being kept spaced from the front surface of the second insulating substrate and includes circuit patterns electrically connected to the output electrodes on the front or side surface of the second insulating substrate and the connection conductors. In this instance, when the first circuit pattern is arranged on the front surface of the second insulating substrate, the circuit pattern on the circuit board constitutes a second circuit pattern. In this instance, arrangement of the first circuit pattern on the front surface of the second insulating substrate may be eliminated.

Electrical connection means are arranged so as to electrically connect the circuit board on the circuit board and the output electrodes on the front or side surface of the second insulating substrate to each other.

The receiving casing is made of metal and includes a bottom wall section formed with a fluid inlet port for introducing pressure measured fluid therethrough and a peripheral wall section connected at one end thereof to the bottom wall section. The receiving casing receives the pressure sensor element and at least a part of the base of the connector body therein so that a fluid chamber which the pressure measured fluid enters may be defined between the pressure sensing surface of the pressure sensor element and the bottom wall section.

The circuit board is supported on a circuit board support structure fixed on the second insulating substrate of the pressure sensor element. The circuit board support structure acts also as the electrical connection means.

The construction of the present invention that the circuit board support structure is fixedly mounted on the second insulating substrate of the pressure sensor element to support the circuit board on the circuit board support structure permits assembling of a pressure sensor unit which prevents application of a pressure at an increased level to the circuit board as encountered with the prior art. Also, the construction that the circuit board support structure functions also as the electrical connection means for electrically connecting the circuit board and the output electrodes on the front surface of the second insulating substrate permits the pressure sensor unit to be simplified in structure and facilitates assembling of the unit, leading to a reduction in manufacturing cost.

In this instance, the circuit patterns on the circuit board and the connection conductors are preferably electrically connected to each other through lead wires. This permits electrical connection between the circuit board supported on the pressure sensor element through the circuit board support structure and the connection conductors incorporated in the connector by soldering or the like during assembling of the pressure sensor unit to be facilitated by defining an interval of a required size between the circuit board and the connection conductors of the connector using lead wires of a required length.

In a preferred embodiment of the present invention, the circuit board support structure is constituted by three or more metal terminal fitments each formed by subjecting a metal plate to machining, wherein the terminal fitments each are provided at one end thereof with a first connection section which is fixed on the circuit board and connected to an electrode section included in the circuit patterns by soldering as required and at the other end thereof with a second connection section which is fixed with respect to the second insulating substrate of the pressure sensor element and connected to each of the output electrodes by soldering. Such construction of three or more such metal terminal fitments into the circuit board support structure facilitates assembling of the circuit board support structure at a low cost. It is a manner of course that a part of the three metal terminal fitments may not be connected to the output electrodes.

When the circuit board support structure is constructed so as to act as the electrical connection means as well, the front surface of the second insulating substrate of the pressure sensor element may be formed with a plurality of fit holes in each of which the second connection section of each of the metal terminal fitments is tightly fitted, wherein the second connection section of each of the metal terminal fitments includes a fit portion fitted in each of the fit holes and a soldered portion arranged so as to extend along the front surface of the second insulating substrate and connected to the electrode section. Thus, a part of the second connection section of each of the metal terminal fitments is tightly fitted in the fit hole of the front surface of the second insulating substrate, so that the metal terminal fitment may be arranged on the second insulating substrate in a manner to upwardly extend therefrom. Also, the soldered portion extending along the front surface of the second insulating substrate is connected to the electrode section on the second insulating substrate by soldering, resulting in the mechanical fixing and electrical connection being facilitated.

Further, in a preferred embodiment of the present invention, the first connection section of the metal terminal fitment is constructed so as to interposedly support the circuit board in a direction of thickness thereof. This facilitates fixing of the circuit board by means of the first connection section.

In the capacitance-type pressure sensor unit described above, the circuit board is supported by only the metal terminal fitments. Alternatively, the circuit board may be supported by only the connection conductors. In this instance, the circuit board is formed with a plurality of through-holes via which the connection conductors are inserted at a distal end thereof, resulting in being supported on the distal end of each of the connection conductors. This permits assembling of the pressure sensor unit without applying a pressure at an increased level to the circuit board, unlike the prior art. In this instance, the electrical connection means which include a plurality of metal terminal fitments each formed by subjecting a flexible metal plate to machining are arranged, wherein the terminal fitments each are provided at one end thereof with a first connection section formed with through-holes via which the connection conductors are inserted at the distal end thereof and connected to the distal end by soldering and at the other end thereof with a second connection section which is fixed with respect to the second insulating substrate of the pressure sensor element and connected to each of the output electrodes by soldering. When the circuit pattern (first circuit pattern) is formed on the front surface of the second insulating substrate of the pressure sensor element, the second connection section of each of the metal terminal fitments may be connected to the electrode section contained in the first circuit pattern by soldering. Such metal terminal fitments permit the output electrodes on the second insulating substrate and the circuit pattern (second circuit pattern) on the circuit board to be connected to each other. Alternatively, the electrode section of the first circuit pattern and the second circuit pattern on the circuit board may be connected to each other through the connection conductors of the connector. The electrical connection means are formed by machining of a metal plate, to thereby be reduced in manufacturing cost as compared with a flexible printed board, leading to a reduction in cost of the pressure sensor unit.

In a preferred embodiment of the present invention, the front surface of the second insulating substrate of the pressure sensor element is formed with a plurality of fit holes in each of which the second connection section of each of the metal terminal fitments is tightly fitted, wherein the second connection section of each of the metal terminal fitments includes a fit portion fitted in each of the fit holes and a soldered portion arranged so as to extend along the front surface of the second insulating substrate and connected to the electrode section. Thus, the fit portion of the second connection section of the terminal fitment is tightly fitted in the fit hole of the second insulating substrate, resulting in being raised and the soldered portion of the second connection section is connected to either the output electrode on the second insulating substrate or the output electrode of the first circuit pattern by soldering, so that the terminal fitment may be mechanically fixed on the second insulating substrate with ease while being electrically connected thereto.

In a preferred embodiment of the present invention, the metal terminal fitments are fixed on a single molded piece made of an insulating resin material. Such a molded piece permits fixing of the metal terminal fitments and electrical connection thereof to be efficiently attained. In this instance, the metal terminal fitments are preferably insert-molded in the molded piece. This permits incorporation of the terminal fitments into a common molded piece to be readily accomplished in a lump.

Thus, the capacitance-type pressure sensor unit of the present invention is so constructed that the circuit board is supported by at least one of the connection conductors of the connector and the metal terminal fitments. Such construction permits assembling of the pressure sensor unit to be attained without applying a pressure at an increased level to the circuit board, unlike the prior art. Also, the pressure sensor element and the circuit patterns of the circuit boards are electrically connected to each other through the metal terminal fitments, so that the electrical connection therebetween may be smoothly carried out even when the circuit board is kept suspended in the circuit component receiving chamber.

BRIEF DESCRIPTION OF DRAWINGS

FIGS. 1(A) to 1(C) show a first embodiment of a capacitance-type pressure sensor unit according to the present invention, wherein FIG. 1(A) is a plan view of the capacitance-type pressure sensor unit, FIG. 1(B) is a section view taken along line 1B—1B of FIG. 1(A) and FIG. 1(C) is a sectional view taken along line 1C—1C of FIG. 1(A);

FIGS. 10(A) and 10(B) show a third embodiment of a capacitance-type pressure sensor unit according to the present invention, wherein FIG. 10(A) is a vertical sectional view of the capacitance-type pressure sensor unit and FIG. 10(B) is a sectional end view taken along line 10B—10B of FIG. 10(A);

FIGS. 13(A) and 13(B) show a modification of the capacitance-type pressure sensor unit shown in FIGS. 10(A) and 10(B), wherein FIG. 13(A) is a vertical sectional view of the pressure sensor unit and FIG. 13(B) is a sectional end view taken along line 13B—13B of FIG. 13(A)

BEST MODE FOR CARRYING OUT INVENTION

Figure 2A:
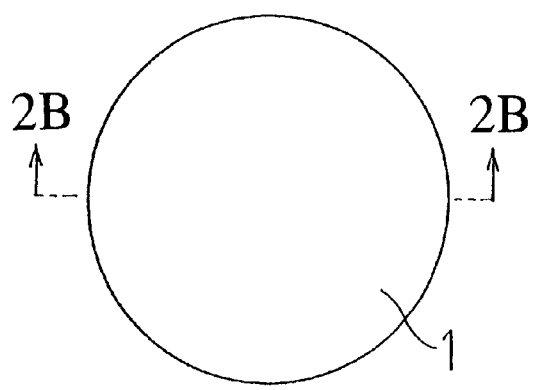
FIG. 2(A) is a plan view showing a first insulating substrate incorporated in the capacitance-type pressure sensor unit shown in FIG. 1(A)
Figure 2B:
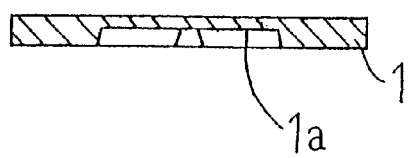
FIG. 2(B) is a sectional view taken along line 2B—2B of FIG. 2(A)
Figure 2C:
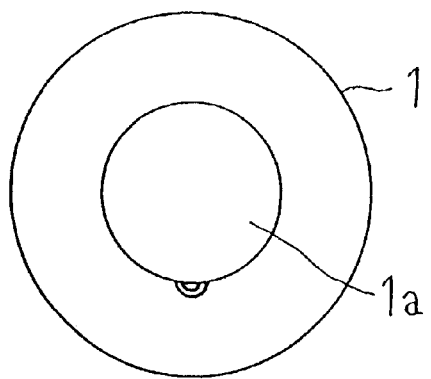
FIG. 2(C) is a sectional view of the first insulating substrate shown in FIG. 2(A)
Figure 3A:
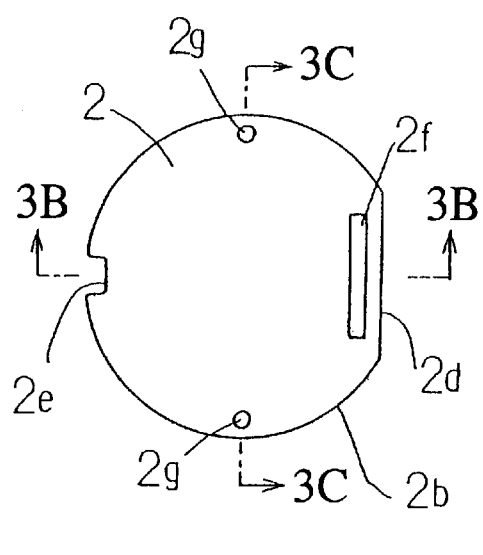
FIG. 3(A) is a plan view showing a second insulating substrate incorporated in the capacitance-type pressure sensor unit shown in FIG. 1(A)
Figure 3B:
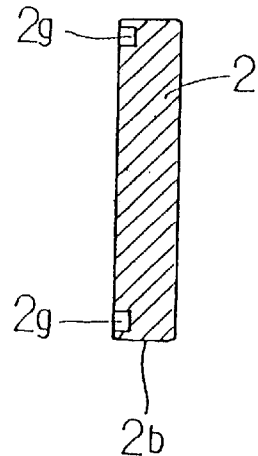
FIG. 3(B) is a sectional view taken along line 3B—3B of FIG. 3(A)
Figure 3C:
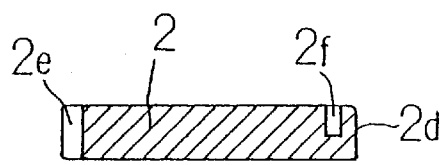
FIG. 3(C) is a sectional view taken along line 3C—3C of FIG. 3(A)
Figure 3D:
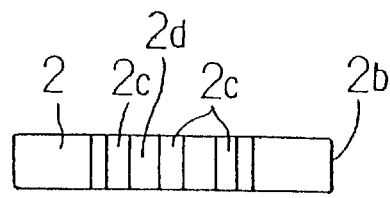
FIG. 3(D) is a right side elevation view of the second insulating substrate shown in FIG. 3(A)
Figure 4A:
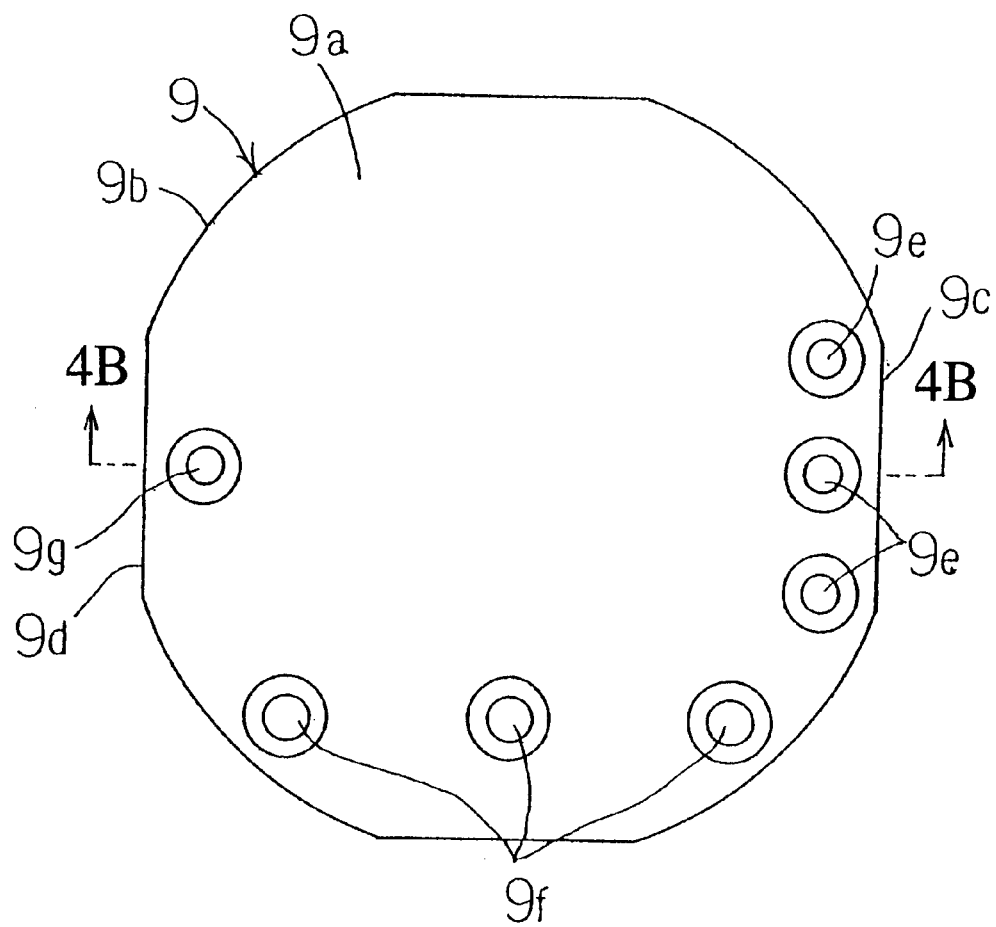
FIG. 4(A) is a bottom view showing a circuit board incorporated in the capacitance-type pressure sensor unit shown in FIG. 1(A), from which a circuit pattern is omitted for the sake of brevity.
Figure 4B:
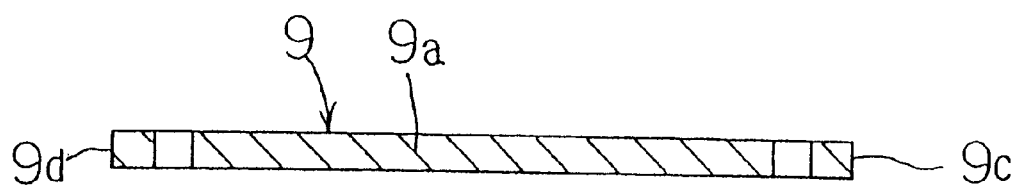
FIG. 4(B) is a sectional view taken along line 4B–4B of FIG. 4(A)
Figure 5A:
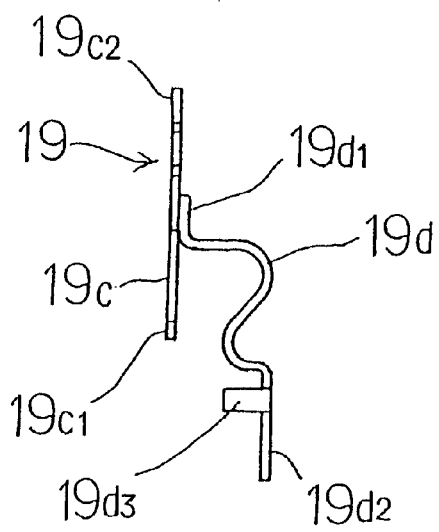
FIG. 5(A) is a front elevation view showing a metal terminal fitment incorporated in the capacitance-type pressure sensor unit shown in FIG. 1(A)
Figure 5B:
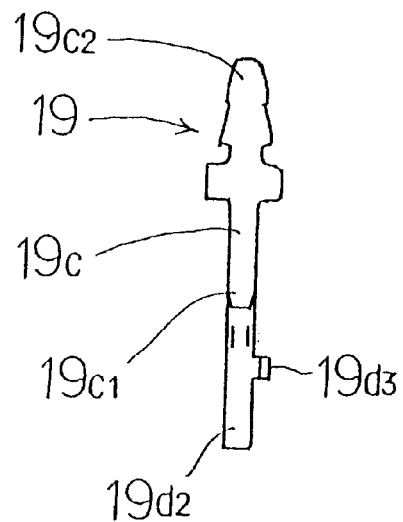
FIG. 5(B) is a left side elevation view of the terminal fitment shown in FIG. 5(A)
Figure 5C:
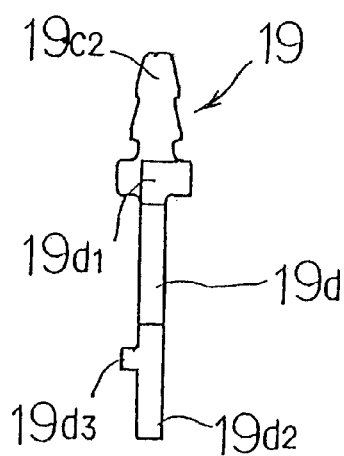
FIG. 5(C) is a right side elevation view of the terminal fitment shown in FIG. 5(A)
Figure 5D:
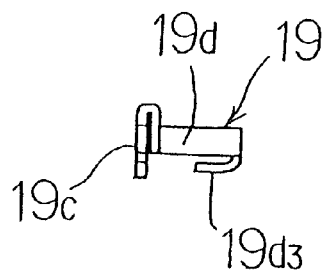
FIG. 5(D) is a plan view of the terminal fitment shown in FIG. 5(A)
Figure 6A:
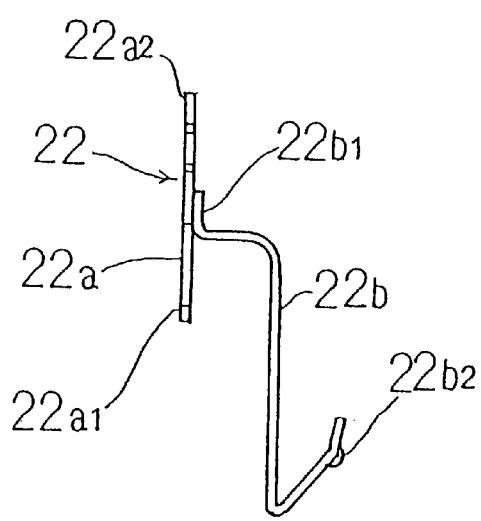
FIG. 6(A) is a front elevation view showing a ground terminal fitment incorporated in the capacitance-type pressure sensor unit shown in FIG. 1(A)
Figure 6B:
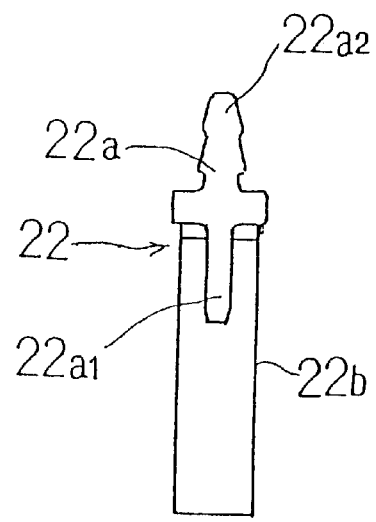
FIG. 6(B) is a left side elevation view of the terminal fitment shown in FIG. 6(A)
Figure 6C:
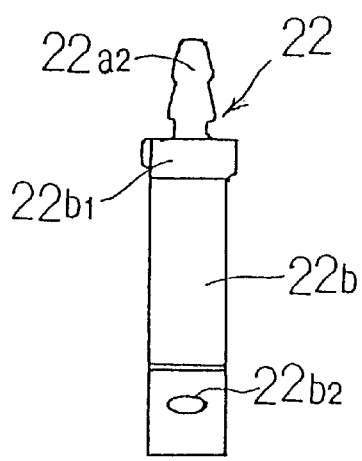
FIG. 6(C) is a right side elevation view of the terminal fitment shown in FIG. 6(A)
Figure 6D:
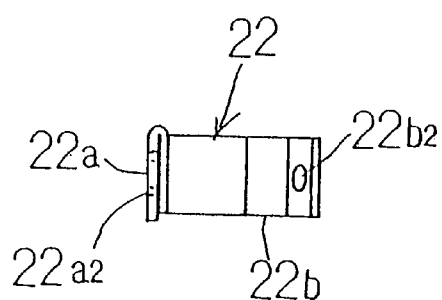
FIG. 6(D) is a plan view of the terminal fitment shown in FIG. 6(A)

Referring first to FIGS. 1(A) to 6(D), a first embodiment of a capacitance-type pressure sensor unit according to the present invention is illustrated; wherein FIG. 1(A) is a plan view showing a capacitance-type pressure sensor unit of the illustrated embodiment, FIG. 1(B) is a sectional view taken along line 1B—1B of FIG. 1(A), FIG. 1(C) is a sectional view taken along line 1C—1C of FIG. 1(A), FIG. 2(A) is a plan view showing a first insulating substrate incorporated in the capacitance-type pressure sensor unit shown in FIG. 1(A), FIG. 2(B) is a sectional view taken along line 2B—2B of FIG. 2(A), FIG. 2(C) is a bottom view of the first insulating substrate shown in FIG. 2(A), FIG. 3(A) is a plan view showing a second insulating substrate incorporated in the capacitance-type pressure sensor unit shown in FIG. 1(A), FIG. 3(B) is a sectional view taken along line 3B—3B of FIG. 3(A), FIG. 3(C) is a sectional view taken along line 3C—3C of FIG. 3(A), FIG. 3(D) is a right side elevation view of the second insulating substrate shown in FIG. 3(A), FIG. 4(A) is a bottom view showing a circuit board incorporated in the capacitance-type pressure sensor unit shown in FIG. 1(A), from which a circuit pattern is omitted for the sake of brevity, FIG. 4(B) is a sectional view taken along line 4B—4B of FIG. 4(A), FIG. 5(A) is a front elevation view showing a metal terminal fitment incorporated in the capacitance-type pressure sensor unit shown in FIG. 1(A), FIG. 5(B) is a left side elevation view of the terminal fitment shown in FIG. 5(A), FIG. 5(C) is a right side elevation view of the terminal fitment shown in FIG. 5(A), FIG. 6(A) is a front elevation view showing a ground terminal fitment incorporated in the capacitance-type pressure sensor unit shown in FIG. 1(A), FIG. 6(B) is a left side elevation view of the terminal fitment shown in FIG. 6(A), FIG. 6(C) is a right side elevation view of the terminal fitment shown in FIG. 6(A) and FIG. 6(D) is a plan view of the terminal fitment shown in FIG. 6(A).

The capacitance-type pressure sensor unit of the illustrated embodiment, as shown in FIGS. 1(A) to 1(C), generally includes a capacitance-type pressure sensor element 3, a circuit board 9, a receiving casing 13 and a connector 5.

The capacitance-type pressure sensor element 3, as shown in FIGS. 1(A) to 1(C), includes a first insulating substrate 1 made of an insulating material such as a ceramic material or the like. The first insulating substrate 1 has a front surface formed thereon with a first capacitance detecting electrode pattern (not shown) and a rear surface acting as a pressure sensing material 1a. The pressure sensor element 3 also includes a second insulating substrate 2 made of an insulating material such as a ceramic material or the like and fixed with respect to the first insulating substrate 1. The second insulating substrate 2 is provided on a rear surface thereof with a second capacitance detecting electrode pattern (not shown), which is arranged opposite to the first capacitance detecting electrode pattern while being spaced therefrom at an interval. The electrode patterns each may be constructed in such a manner as shown in Japanese Patent Application Laid-Open Publication No. 94469/1996, Japanese Patent Application Laid-Open Publication No. 90097/1998 (Japanese Patent Application No. 247395/1996) or the like. The first insulating substrate 1, as shown in FIGS. 2(A) to 2(C), is formed into a contour of a substantially circular shape in plan. The rear surface of the first insulating substrate 1 acting as the pressure sensing surface 1a is recessed in the form of a circular shape of a predetermined radius, resulting in having a thickness sufficient to permit the first insulating substrate 1 to be deformed by a fluid pressure applied thereto. The capacitance-type pressure sensor unit of the illustrated embodiment also includes a second insulating substrate 2, which has a side wall 2b formed thereon with a flat section 2d on which a plurality of output electrodes 2c are arranged. In the illustrated embodiment, three such output electrodes 2c are arranged. Also, the side wall 2b of the second insulating substrate 2 is formed on a portion thereof opposite to the flat section 2d with a recess (groove) 2e in which the other end of a ground terminal fitment described hereinafter is received. The second insulating substrate 2 has a front surface 2a formed thereon with a heat diffusion restraining recess (groove) 2f in a manner to extend in parallel to the flat section 2d while being spaced therefrom at a predetermined interval. Further, the front surface 2a of the second insulating substrate 2 is formed thereon two or more recesses 2g for positioning a connector body described hereinafter while orientating it in parallel with the flat section 2d. In the illustrated embodiment, two such recesses 2g are arranged. The capacitance-type pressure sensor element 3 thus constructed functions to detect a variation in pressure acting on the pressure sensing surface 1a of the first insulating substrate 1 depending on a variation in capacitance between the first capacitance detecting electrode pattern and the second capacitance detecting electrode pattern. Electrical connection between the output electrodes 2c and the first and second capacitance detecting electrode patterns may be established as disclosed in FIGS. 1 and 3 of Japanese Patent Application Laid-Open Publication No. 94469/1996. The output electrodes 2c may be arranged in a manner to be positioned on three wirings constituted of a conductive paste and arranged on a side surface of a pressure sensor element shown in FIGS. 1 and 3 of Japanese Patent Application Laid-Open Publication No. 94469/1996. The output electrodes 2c may be formed of a conductive paste such as a glass silver paint or the like into a thick conductive film. Alternatively, the electrodes 2c may be made in the form of a thin conductive film by deposition or the like. One of three such output electrodes 2c is connected to the first capacitance detecting electrode pattern (counter electrode pattern) on the first insulating substrate 1, another one of them is connected to a main electrode pattern and a reference electrode pattern each included in the second capacitance detecting electrode pattern on the second insulating substrate 2.

The receiving casing 13 is made of metal and, as shown in FIGS. 1(B) and 1(C), includes a casing body formed on one end thereof with an opening and including a bottom wall section 13a provided on the other end thereof and a cylindrical peripheral wall section 13b connected at one end thereof to the bottom wall section 13a. The bottom wall section 13a of the receiving casing 13 is provided with a fluid inlet port 14 which permits a pressure measured fluid such as gas, liquid or the like of which a pressure is to be measured to be introduced therethrough into the capacitance-type pressure sensor unit. In the illustrated embodiment, the receiving casing 13 also includes a cylindrical section 13 integrally provided on a central region of the bottom wall section 13a in a manner to surround the fluid inlet port 14 and a threaded section 13d arranged on an outer periphery of the cylindrical section 13c. The pressure sensor element 3 constituted by a combination of the first insulating substrate 1 and second insulating substrate 2 is arranged in the peripheral wall section 13b of the receiving casing 13 in such a manner that the pressure sensing surface 1a of the first insulating substrate 1 is rendered opposite to the bottom wall section 13a of the receiving casing 13. Between the pressure sensing surface 1a of the first insulating substrate 1 and the bottom wall section 13a of the receiving casing 13 is defined a fluid chamber 15 into which the pressure measured fluid is introduced. Also, between the pressure sensing surface 1a and the bottom wall section 13a is arranged a seal member 16 in a manner to be contacted with the pressure sensing surface 1a, the bottom wall section 13a and the inner peripheral surface of the peripheral wall section 13b to seal the fluid chamber 15. The seal member 16 may be constituted by an O-ring.

The circuit board 9 includes a board member 9a made of a glass-epoxy board material of a one- or more-layer structure and a predetermined circuit pattern formed on each of both or upper and lower surfaces of the board member 9a. More particularly, the board member 9a is mounted on the lower surface thereof with an integrated circuit element 4 which is one of a plurality of electrical circuit components constituting a signal processing circuit for processing an output of the pressure sensor element 3. Also, the board member 9a of the circuit board 9 is mounted on the front surface thereof with electrical circuit components 12a and 12b such as a capacitor or the like for eliminating noise or the like which enters the circuit board 9 from an outer end section 8b of each of connection conductors 8 of the connector 5 described hereinafter. Further, the board member 9a formed into a substantially circular shape, as shown in FIGS. 4(A) and 4(B), is provided on a side wall section 9b thereof defined on a side thereof positionally corresponding to the flat section 2d of the side wall section 2b of the second insulating substrate 2 with a flat section 9c. Also, the side wall section 9b is formed on a portion thereof on a side thereof opposite to the flat section 9c with a flat section 9d. In addition, the board member 9a is formed with a plurality of terminal fitment connection through-holes 9e in a manner to be arranged in a row along the flat section 9c. In addition, the board member 9a is formed on a portion of a peripheral edge thereof extending in a direction perpendicular to the flat section 9c with a plurality of connection conductor connection through-holes 9f in a manner to be arranged in a row in a direction perpendicular to a direction of arrangement of the terminal fitment connection through-holes 9e. In the illustrated embodiment, three such terminal fitment connection through-holes 9e and three such connection conductor connection through-holes 9f are arranged. Moreover, the board member 9a is formed on a portion of the peripheral edge thereof positioned opposite to the flat section 9c with a ground terminal fitment connection through-hole 9g. The through-holes 9e to 9g each are formed at an open end thereof positioned on a rear surface of the board member 9a with a soldering land so as to surround the open end. The circuit pattern for mounting the integrated circuit component 4 and the like thereon is not shown in FIG. 4(A) for the sake of brevity. The circuit board 9 thus constructed is so arranged that a component mounting surface thereof extend along the front surface 2a of the second insulating substrate 2 of the pressure sensor element 3.

The connector 5 includes a connector body (connector housing) 6 made of an insulating material such as a synthetic resin material or the like and including a base 6b formed therein with a circuit component receiving chamber 7 for receiving the circuit board 9 therein in a manner to be open on one surface (lower surface) of the base 6b. Also, the connector 5 includes a plurality of the above-described connection conductors (connector terminals) 8 fixed in the connector body 6 in such a manner that one end thereof is projected into the circuit component receiving chamber 7 and electrically connected to the circuit pattern on the circuit board 9 and the other end thereof is outwardly exposed. In the illustrated embodiment, the base 6b of the connector 5 is provided on an outer periphery of a distal end thereof with two or more projections 6d, which are fitted in the recesses 2g of the front surface 2a of the second insulating substrate 2, resulting in relative positioning between the connector body 6 and the pressure sensor element 3 being ensured. In the illustrated embodiment, two such projections 6d are arranged. The connection conductors 8 each are so arranged that an inner end 8a thereof is fittedly inserted into each of the connection conductor connection through-holes 9f of the circuit board 9 and then connected to the soldering land around the through-hole 9f by soldering, resulting in being electrically connected to the circuit pattern (not shown).

The circuit board 9 is arranged in the circuit component receiving chamber 7 in a substantially suspended manner while being mechanically supported by cooperation of the connection conductors 8, the base 6b of the connector body 6, a plurality of metal terminal fitments 19 fixed on the second insulating substrate 2 of the pressure sensor element 3 and acting as a circuit board support structure 18 as well, and a ground terminal fitment 22. In the illustrated embodiment, three such metal terminal fitments 19 are arranged. The circuit patterns on the circuit board 9 and the output electrodes 2c of the pressure sensor element 3 are electrically connected to each other by means of three such metal terminal fitments 19.

The metal terminal fitments 19, as shown in FIGS. 1(A) and 5(A) to 5(D), each include a first section 19c and a second section 19d. The first section 19c of the metal terminal fitment 19 has one end 19c1 inserted through each of the terminal fitment connection through-holes 9e and connected to the soldering land formed around the through-hole 9e by soldering. The first section 19c also has the other end 19c2 tightly fitted in a portion of a wall of the connector body 6 which defines the circuit component receiving chamber 7 and arranged opposite to the circuit board 9. The second section 19d has one end 19d1 formed integrally with the first end 19c and the other end 19d2 connected to each of the output electrodes 2c of the pressure sensor element 3 by soldering. The second section 19d is formed at a portion thereof between the one end 19d1 and the other end 19d2 into a meandering shape, resulting in exhibiting elasticity.

In electrical connection of the other end 19d2 of the second section 19d of the metal terminal fitment 19 to the output electrode 2c provided on the side wall section 2b of the second insulating substrate 2 of the pressure sensor element 3 by soldering, heat by the soldering is diffused to the second insulating substrate 2, leading to a failure in satisfactory soldering the other end 19d2 of the second section 19d to the output electrode 2c. In view of such a disadvantage, in the illustrated embodiment, the second insulating substrate 2 is formed thereon with the heat diffusion restraining recess (groove) 2f in a manner to extend in parallel to the flat section 2d on which the output electrodes 2c are arranged. The recess 2f effectively restrains the heat diffusion described above, to thereby ensure satisfactory soldering of the other end 19d2 of the second section 19d to the output electrode 2c. Also, the second section 19d of the metal terminal fitment 19 is provided at an intermediate portion thereof with a positioning projection 19d3 in a sideways manner which is abutted against the front surface of the second insulating substrate 2 during positioning of the other end 19d2 of the second section 19d with respect to the second section 19d.

The ground terminal fitment 22 is connected to the soldering land (ground electrode) arranged around the ground terminal fitment connection through-hole 9g (FIG. 4) formed through the circuit pattern on the circuit board 9. The ground terminal fitment 22 includes a first section 22a and a second section 22b. The first section 22a has one end 22a1 connected via the ground terminal fitment connection through-hole 9g of the circuit board 9 to the soldering land formed around the rear-side opening of the through-hole 9g by soldering and the other end 22a2 tightly fitted in a portion of a wall of the connector body 6 which surrounds the circuit component receiving chamber 7 and is opposite to the circuit board 9, resulting in being fixed to the connector body 6. Also, the second section 22b has one end 22b1 integrated with the first section 22a and the other end 22b2 bent into a hook-like shape and contacted with an inner surface of the receiving casing 13 while exhibiting elasticity. The second section 22b is curved at a portion between the one end 22b1 and the other end 22b2, resulting in exhibiting elasticity. In the illustrated embodiment, the second section 22b is so formed that the other end 22b2 extends to the second insulating substrate 2 and is fitted in the recess 2e of the side wall section 2b of the second insulating substrate 2, resulting in being contacted with the inner surface of the receiving casing 13.

More particularly, in the illustrated embodiment, the circuit board 9 is supported by cooperation of a plurality of the connection conductors 8 of the connector 5, a plurality of the metal terminal fitments 19 and the ground terminal fitment 22 while being kept suspended in the circuit component receiving chamber 7.

The circuit board 9 is received in the circuit component receiving chamber 7 of the connector 5 and connected to the three metal terminal fitments 19 and ground terminal fitment 22 by soldering and then the end 19d2 of each of the three metal terminal fitments 19 is connected to each of the output electrodes 2c of the pressure sensor element 3 by soldering.

Then, the base 6b of the connector body 6 and the pressure sensor element 3 are inserted into the receiving casing 13 while keeping the pressure sensor element 2 temporarily fixed to the end of the connector 5. During the operation, an annular seal member 17 constituted by an O-ring is interposedly arranged between a connector-side step 6e annularly formed on an outer periphery of the base 6b of the connector body 6 and a portion of an inner surface of the side wall section 13b of the receiving casing 13 to provide waterproof sealing between the connector-side step 6e and a casing-side step 13f formed on the inner surface of the receiving casing 13. Arrangement of the seal member or O-ring 17 therebetween while keeping it compressed effectively prevents leakage of fluid from the peripheral wall section 13b of the receiving casing 13 and the outer periphery of the base 6b of the connector body 6. Also, as described above, the seal member 16 is interposedly arranged between the pressure sensor element 3 and the bottom wall section 13a of the receiving casing 13. Then, an end 13e of the receiving casing 13 is subject to caulking (curling) toward the outer periphery of the base 6b of the connector body 6, resulting in assembling of the pressure sensor unit being completed.

Supporting of the circuit board 9 by cooperation of the three connection terminals 8 of the connector 5, the three metal terminal fitments 19 and the ground terminal fitment 22 while keeping it substantially suspended in the circuit component receiving chamber 7 prevents application of a pressure at an increased level to the circuit board 9 during the caulking as encountered with the prior art. Also, in the illustrated embodiment, the three metal terminal fitments 19 and ground terminal fitment 22 are so constructed that the second sections 19d and 22b exhibit elasticity. The thus-exhibited elasticity permits the second sections to absorb a variation in dimensions during the caulking, to thereby prevent application of undue force to the soldered portions during the assembling. Also, in the illustrated embodiment, the metal terminal fitments 19 function as both the electrical connection means for electrically connecting the circuit board 9 and the output electrodes 2c of the second insulating substrate 2 to each other and the mechanical support means for supporting the circuit board 9, so that the pressure sensor unit may be simplified in structure and reduced in manufacturing cost.

Also, use of the three metal terminal fitments 19 for electrical connection between the pressure sensor element 3 and the circuit patterns on the circuit board 9 permits the pressure sensor element 3 and the circuit patterns on the circuit board 9 to be satisfactorily electrically connected to each other even when the circuit board 9 is arranged in the circuit component receiving chamber 7 while being kept suspended therein. In particular, in the illustrated embodiment, the metal terminal fitments 19 each permit the one end 19c1 of the first section 19c to electrically connect the fitment 19 to the electrode incorporated in each of the circuit patterns on the circuit board 9 by soldering and the other end 19c2 to fix it to the portion of the wall of the connector body 6 which surrounds the circuit component receiving chamber 7 and is opposite to the circuit board 9. Also, the second section 19d may be integrated at the one end 19d1 thereof with the first section 19c and connected at the other end 19d2 thereof to the output electrode 2c of the pressure sensor element 3 by soldering.

In addition, the ground electrode of the circuit pattern on the circuit board 9 and the receiving casing are electrically connected to each other with ease by means of the ground terminal fitment 22 made of metal. In particular, in the illustrated embodiment, the ground terminal fitment 22 permits the one end 22a1 of the first section 22a to be connected to the electrode incorporated in the circuit pattern on the circuit board 9 and the other end 22a2 to be fixed to the portion of the wall of the connector body 6 which surrounds the circuit component receiving chamber 7 and is opposite to the circuit board 9. Further, the second section 22b may be integrated at the one end 22b1 thereof with the first section 22a and contacted at the other end 22b2 with the inner surface of the receiving casing 3.

Further, the first insulating substrate 1 of the pressure sensor element 3 is formed into a contour in plan of a substantially circular shape. Such configuration of the first insulating substrate 1 facilitates sealing between the first insulating substrate 1 and the peripheral wall section 13b of the receiving casing 14 by means of the seal member 16 in the fluid chamber 15 defined between the pressure sensing surface 1a of the first insulating substrate 1 and the bottom wall section 13a of the receiving casing 13. Also, when the side wall section 2b of the second insulating substrate 2 of the pressure sensor element 3 is formed with the flat section 2d on which the output electrodes 2c are arranged, arrangement of the output electrodes 2c may be facilitated using the flat section 2d. Moreover, when the side wall section 2b of the second insulating substrate 2 is formed on the portion thereof opposite to the flat section 2d with the recess 2e in which the other end 22b2 of the ground terminal fitment 22 is fitted, the other end 22b2 of the ground terminal fitment 22 is permitted to be contacted with the inner surface of the receiving casing 13 through the recess 2e, so that the other end 22b2 of the ground terminal fitment 22 may be formed into any desired length without adversely affecting the pressure sensor unit.

Furthermore, the connector body 6 is integrally provided on the end thereof with the projections 6d and correspondingly the second insulating substrate 2 of the pressure sensor element 3 is formed on the front surface thereof with the recesses 2g in which the projections 6d are fitted, resulting in relative positioning between the connector body 6 and the second insulating substrate 2 of the pressure sensor element 3 being ensured.

In the illustrated embodiment, the integrated circuit element 4 is arranged on the rear surface of the circuit board 9. Alternatively, it may be provided on the front surface of the circuit board 9.

Figure 7:
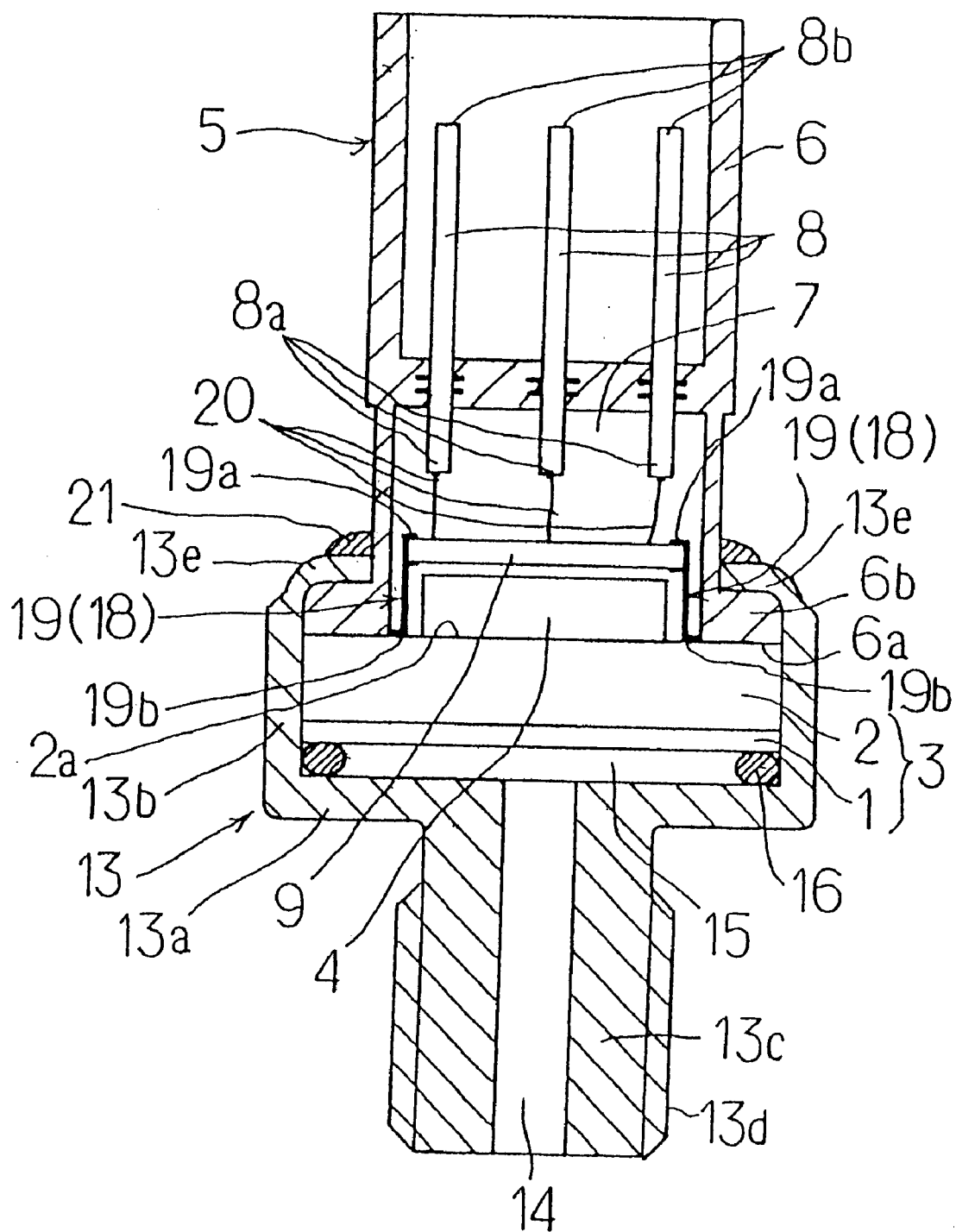
FIG. 7 is a vertical sectional view showing a second embodiment of a capacitance-type pressure sensor unit according to the present invention.
Figure 8A:
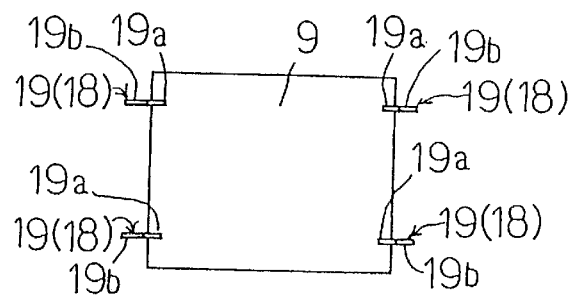
FIG. 8(A) is a plan view showing a circuit board support structure on which a circuit board is supported.
Figures 8B, 8C:
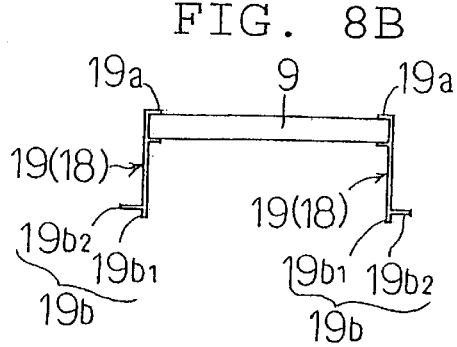
FIG. 8(B) is a front elevation view of the circuit board support structure shown in FIG. 8(A)
FIG. 8(C) is a right side elevation view of the circuit board support structure shown in FIG. 8(A)
Figure 14:
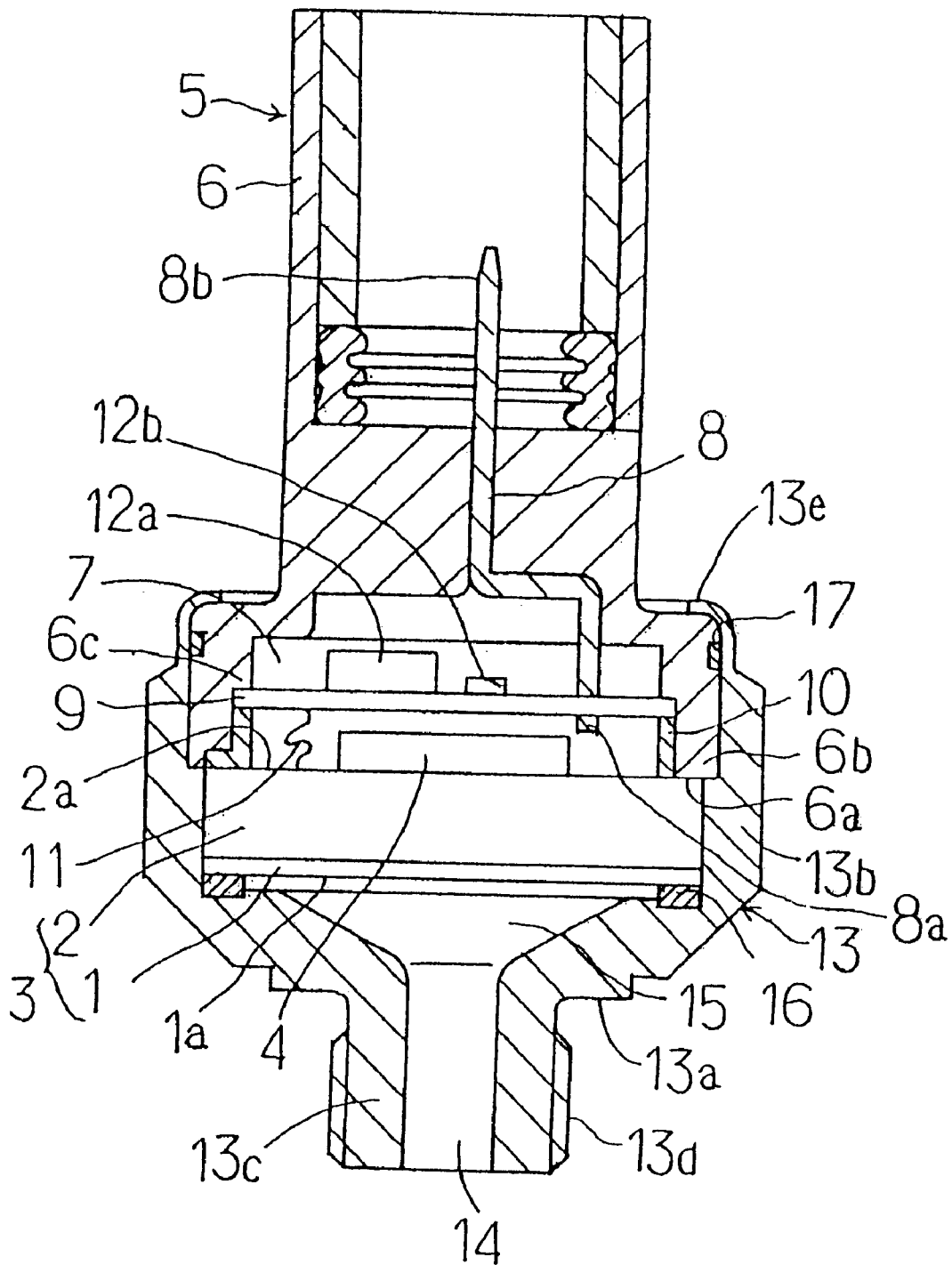
FIG. 14 is a vertical sectional view showing a conventional capacitance-type pressure sensor unit which is to be improved by the present invention.

Referring now to FIGS. 7 and 8(A) to 8(C), a second embodiment of a capacitance-type pressure sensor unit according to the present invention is illustrated, wherein FIG. 7 is a vertical sectional view of a capacitance-type pressure sensor unit of the illustrated embodiment, FIG. 8(A) is a plan view showing a circuit board support structure 18 on which a circuit board 9 is supported, FIG. 8(B) is a front elevation view of the circuit board support structure shown in FIG. 8(A), and FIG. 8(C) is a right side elevation view of the circuit board support structure shown in FIG. 8(A). Reference characters in FIGS. 7 to 8(C) like those in FIG. 14 designate corresponding parts.

The capacitance-type pressure sensor unit of the illustrated embodiment is so constructed that a second insulating substrate 2 is mounted on a front surface 2a thereof with at least one electric circuit component 4 such as an integrated circuit element or the like for processing an output of a pressure sensor element 3 while being electrically connected to a first circuit pattern (not shown) on the front surface 2a of the second insulating substrate 2.

The circuit board 9 is supported by the circuit board support structure 18 constituted of four terminal fitments 19 made of metal and fixed on the second insulating substrate 2 of the pressure sensor element 3. The metal terminal fitments 19 not only function to constitute the circuit board support structure 18 for supporting the circuit board 9 but act as electrical connection means like the electrical connection means 11 shown in FIG. 14.

The metal terminal fitments 19 each may be formed by subjecting a metal plate to machining such as pressing, bending or the like. The metal terminal fitment 19 is provided at one end thereof with a first connection section 19a fixed to the circuit board 9 and connected to an electrode section incorporated in a second circuit pattern (now shown) on the circuit board 9 by soldering as required and at the other end thereof with a second connection section 19b fixed to the second insulating substrate 2 of the pressure sensor element 3 and connected to an electrode section incorporated in a first circuit pattern (not shown) formed on the front surface of the second insulating substrate 2 by soldering. The first connection section 19a provided at a distal end of the metal terminal fitment 19 is constructed so as to interposedly support the circuit board 9 in a direction of thickness of the circuit board 9. The first connection section 19a for interposedly supporting the circuit board 9 is connected to the electrode section incorporated in the second circuit pattern (now shown) on the circuit board 9. The first connection section 19a for interposedly supporting the circuit board 9 may be constructed in any desired manner. In the illustrated embodiment, the first connection section 19a is constituted of a pair of holding elements arranged opposite to each other. Such construction of the first connection section 19a facilitates holding of the circuit board 9 by the first connection section 9. In order to reinforce the holding, an adhesive may be applied in a manner to extend over the first connection section 19a and circuit board 9.

The second connection section 19b of the metal terminal fitment 19 includes a fit portion 19b1 fitted in each of fit holes (not shown) of the second insulating substrate 2 of the pressure sensor element 3 and a soldered portion 19b2 arranged so as to extend along the front surface of the second insulating substrate 2, resulting in being fixed to the second insulating substrate 2 and connected to the electrode section incorporated in the first circuit pattern by soldering. For this purpose, the metal terminal fitment 19 is arranged on the second insulating substrate 2 so as to upwardly extend therefrom by tightly fitting the fit portion 19b1 of the second connection section 19 in the fit hole of the front surface of the second insulating substrate 2 of the pressure sensor element 3. Then, the metal terminal fitment 19 extends at the soldered portion 19b2 thereof along the front surface of the second insulating substrate 2, resulting in being connected to the electrode section (not shown) of the first circuit pattern by soldering. In fitting of the fit portion 19b1 of the second connection section 19b in the fit hole of the second insulating substrate 2, an adhesive may be previously charged in the fit hole, to thereby enhance fixing of the metal terminal fitment 19 to the second insulating substrate 2.

The second circuit pattern (not shown) on the circuit board 9 and an inner end 8a of each of a plurality of connection conductors 8 of a connector 5 are electrically connected to each other through a lead wire 20 of a suitable length during assembling of the pressure sensor unit. Such electrical connection between the second circuit pattern on the circuit board 9 and the connection conductors 8 of the connector 9 through the lead wires 20 of a required length permits electrical connection between the circuit board 9 supported on the pressure sensor element 3 through the metal terminal fitments 18 and the connection conductors 8 incorporated in the connector 5 to be facilitated by defining an interval of a required size between the circuit board 9 and the connection conductors 8 of the connector 5 using the lead wires 10 of a required length.

An engagement between a connector body 6 and an end edge 13e of a receiving casing 13 by caulking is sealed by means of an external seal 21 formed by application of an adhesive or the like.

Such supporting of the circuit board 9 by the metal terminal fitments 19 fixed to the second insulating substrate 2 of the pressure sensor element 3 permits assembling of the pressure sensor unit to be attained while keeping a pressure at an increased level from being applied to the circuit board, unlike the prior art. Also, the metal terminal fitments 19 act also as the electrical connection means for electrically connecting the circuit board 9 and the first circuit pattern on the front surface of the second insulating substrate 2 to each other, so that the pressure sensor unit may be simplified in structure and reduced in manufacturing cost.

In the illustrated embodiment, the first connection section 19a of each of the metal terminal fitments 19 is constructed so as to interposedly support the circuit board 9, however, the first connection section 19a is not limited to such construction. For example, the illustrated embodiment may be constructed in such a manner that the circuit board 9 is formed with through-holes for mounting and the first connection section 19a includes a fit portion fitted in each of the mounting through-holes and a support portion for the circuit board 9. Also, in the illustrated embodiment, the circuit board support structure 18 is constituted of the four metal terminal fitments 19. However, the number of metal terminal fitments 19 is merely set so as to permit them to support the circuit board 9. Thus, three or more such metal terminal fitments 19 are required.

Figure 9:
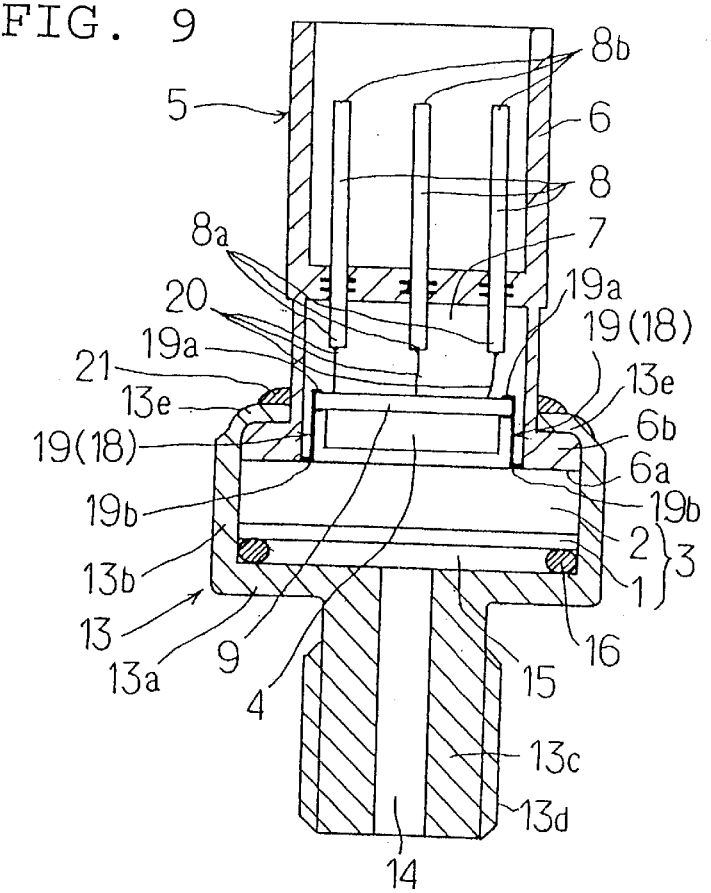
FIG. 9 is a vertical sectional view showing a modification of the capacitance-type pressure sensor unit shown in FIG. 7.

Referring now to FIG. 9, a modification of the capacitance-type pressure sensor unit described above with reference to FIG. 7 is illustrated. A capacitance-type pressure sensor unit of the modification includes at least one electric circuit component 4 such as an integrated circuit or the like which is electrically connected to a circuit pattern (not shown) arranged on a rear surface of a circuit board 9 to carry out processing of an output of a pressure sensor element 3. Thus, in the modification, the electric circuit component 4 is not arranged on a front surface 2a of a second insulating substrate 2, unlike the embodiment shown in FIG. 7. Instead, the front surface 2a of the second insulating substrate 2 is formed thereon with output electrodes of the pressure sensor element 3 and metal terminal fitments 19 are arranged so as to electrically connect the output electrodes and the circuit patterns on the circuit board 9 to each other therethrough. The remaining part of the modification may be constructed in substantially the same manner as the embodiment of FIG. 7.

Figure 10A:
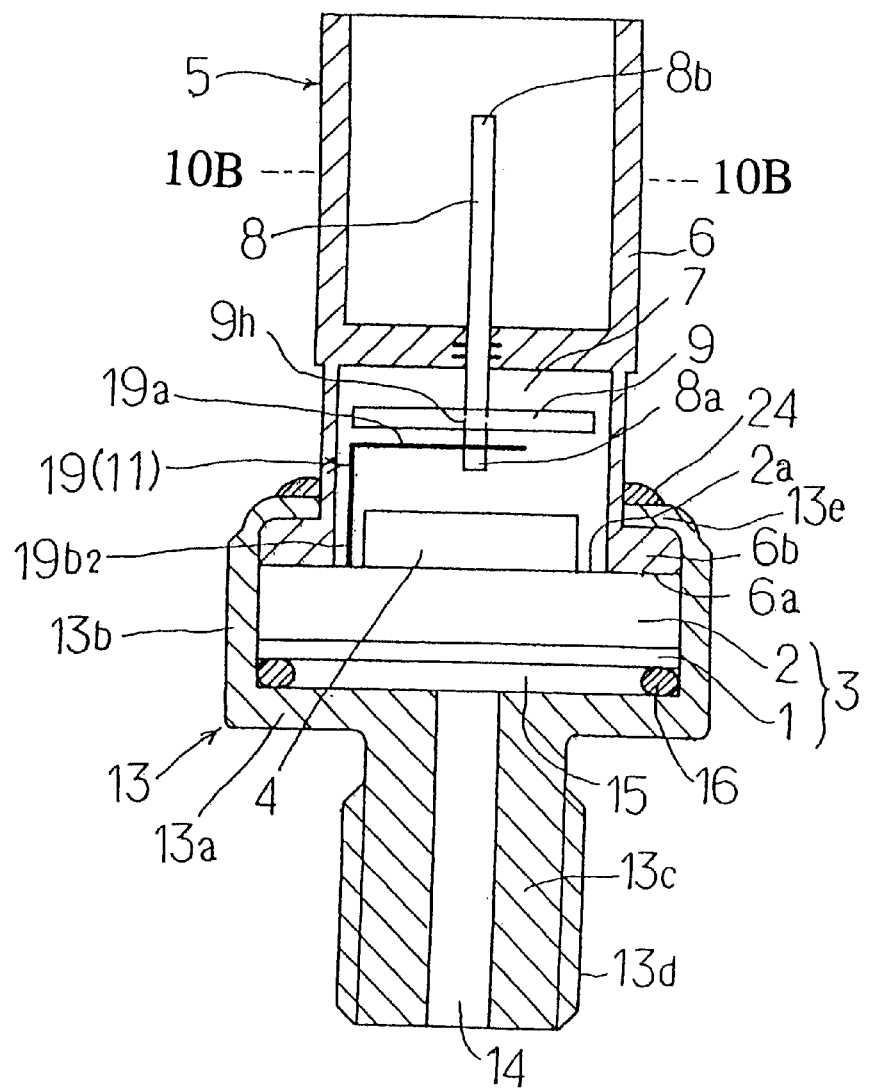
Figure 10B:
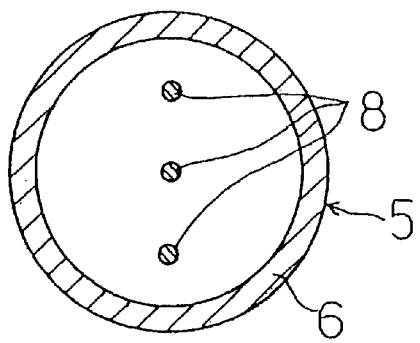
Figure 11A:
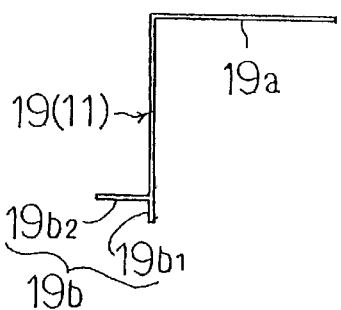
FIG. 11(A) is a front elevation view showing a metal terminal fitment incorporated in the capacitance-type pressure sensor unit shown in FIG. 10(A)
Figure 11B:
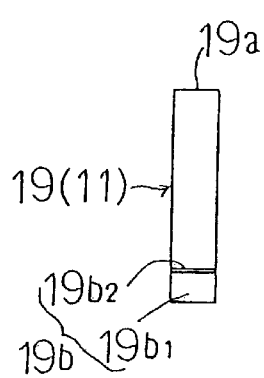
FIG. 11(B) is a left side elevation view of the terminal fitment shown in FIG. 11(A)
Figure 11C:
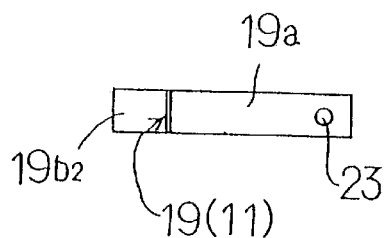
FIG. 11(C) is a plan view of the terminal fitment shown in FIG. 11(A)

Referring now to FIGS. 10(A) and 10(B) and FIGS. 11(A) to 11(C), a third embodiment of a capacitance-type pressure sensor unit is illustrated, wherein FIG. 10(A) is a vertical sectional view of a capacitance-type pressure sensor unit of the third embodiment, FIG. 10(B) is a sectional end view taken along line 10B–10B of FIG. 10(A), FIG. 11(A) is a front elevation view showing a metal terminal fitment incorporated in the capacitance-type pressure sensor unit shown in FIG. 10(A), FIG. 11(B) is a left side elevation view of the terminal fitment shown in FIG. 11(A) and FIG. 11(C) is a plan view of the terminal fitment shown in FIG. 11(A). Reference characters in FIGS. 10(A) to 11(C) like those in FIG. 4 designate corresponding parts.

The capacitance-type pressure sensor unit of the third embodiment is so constructed that at least one electric circuit component 4 such as an integrated circuit or the like which is electrically connected to a first circuit pattern (not shown) arranged on a front surface 2a of a second insulating substrate 2 to carry out processing of an output of a pressure sensor element 3 is mounted on the front surface 2a of the second insulating substrate 2 by soldering.

A connector 5 includes a plurality of connection conductors 8. In the illustrated embodiment, the connector 5 includes three such connection conductors or an input terminal, an output terminal and a ground terminal. The connection conductors 8 are arranged in a row in a direction normal to the sheet of FIG. 10(A) and in a row in a vertical direction in FIG. 10(B).

A circuit board 9 is formed with a plurality of through-holes 9h and the connection conductors 8 of the connector 5 each are formed with an inwardly-directed end 8a, which is inserted through each of the through-holes 9h. The through-holes 9h each are provided therein with a through-hole conductor electrically connected to a second circuit pattern. The through-hole conductor is formed into a cylindrical shape or formed at a central portion thereof with a through-hole. The circuit board 9 is formed on a rear surface thereof with soldering lands each electrically connected to each of the through-hole conductors. The connection conductors 8 inserted through the through-holes 9h each are connected at the end thereof to each of the lands by soldering, so that the circuit board 9 is supported by the distal end or inwardly-directed end 8a of each of the connection conductors. In order to facilitate positioning of the circuit board 9, the distal end or inwardly-directed end 8a may be formed with a step against which a front surface of the circuit board 9 is abutted.

Electrical connection means 11 are constituted of a plurality of metal terminal fitments 19 each made by subjecting a flexible metal plate to machining such as pressing, bending or the like. In the illustrated embodiment, the electrical connection means 11 are constituted by three such metal terminal fitments 19. The metal terminal fitments 19 are arranged in a row in a direction normal to the sheet of FIG. 10(A) in correspondence to arrangement of the connection conductors 8.

The metal terminal fitments 19, as shown in FIG. 11(C), each are provided at one end thereof with a first connection section 19a, which is formed with a through-hole 23 through which the distal end or inwardly-directed end 8a of the connection conductor 8 is inserted and connected to the inwardly-directed end 8a of the connection conductor 8 by soldering. Also, the metal terminal fitment 19 is provided at the other end thereof with a second connection section 19b fixed to the second insulating substrate 2 of the pressure sensor element 3 and connected to an electrode section incorporated in a first circuit pattern (not shown) on the second insulating substrate 2 by soldering. The second connection section 19b includes a fit portion 19b1 fitted in a fit hole provided in the second insulating substrate 2 as described hereinafter and a soldered portion 19b2 arranged so as to extend along the front surface 2a of the second insulating substrate 2 and connected to the electrode section of the first circuit pattern by soldering. The metal terminal fitments 19 thus constructed permit the electrode section of the first circuit pattern on the second insulating substrate 2 and the second circuit pattern on the circuit board 9 to be connected to each other through the connection conductors 8 of the connector 5.

In this instance, the construction that the terminal fitments 19 each are connected through the connection conductor 8 of the connector 5 to the second circuit pattern on the circuit board 9 does not adversely affect the pressure sensor unit, because the electric circuit component mounted on the second circuit pattern on the circuit board 9 is constituted of a noise removing component such as a noise removing capacitor or the like for removing noise intruding from the outside through the connection conductors 8 into the circuit board and connected between one connection conductor 8 for grounding and two connection conductors 8 for signal outputting and inputting.

The second insulating substrate 2 of the pressure sensor element 3 is formed on the front surface thereof with a plurality of fit holes (not shown) in each of which the fit portion 19b1 of the second connection section 19b of each of the metal terminal fitments 19 is tightly fitted. The metal terminal fitments 19 each are constructed in such a manner that the fit portion 19b1 of the second connection section 19b is tightly fitted in the corresponding fit hole of the second insulating substrate 2 and the soldered portion 19b2 of the second connection section 19b is arranged along the front surface 2a of the second insulating substrate 2 and connected to the corresponding electrode section of the first circuit pattern on the front surface 2a of the second insulating substrate 2 by soldering. This results in the metal terminal fitments 19 being arranged on the second insulating substrate 2 in a manner to upwardly extend therefrom or be raised. The fit holes each may be previously charged therein with an adhesive, resulting in fixing of the metal terminal fitment with respect to the second insulating substrate 2 being enhanced.

An engagement between a connector body 6 and an end edge 13e of a receiving casing 13 by caulking is sealed by means of an external seal 21 formed by application of an adhesive or the like.

Such supporting of the circuit board 9 on the distal end of each of the connection conductors 8 of the connector 5 permits assembling of the pressure sensor unit while preventing application of a pressure at an increased level to the circuit board 9 encountered with the prior art.

Also, the second insulating substrate 2 of the pressure sensor element 3 is formed on the front surface thereof with a plurality of fit holes in each of which the fit portion 19b1 of the second connection section 19b of each of the metal terminal fitments 19 is tightly fitted, so that the fit portion 19b1 of the second connection section 19b of each of the terminal fitments 19 is tightly fitted in each of the fit holes, resulting in the terminal fitment being raised. Also, the soldered portion 19b2 of the second connection section 19b is connected to the electrode section of the first circuit pattern on the front surface 2a of the second insulating substrate 2 by soldering. This permits the terminal fitment 19 to be readily mechanically fixed to the second insulating substrate 2 while being electrically connected thereto.

Also, flexibility of the metal terminal fitments 19 permits insertion of each of the connection conductors 8 through the through-hole 23 of the first connection section 19a of each of the metal terminal fitments 19 for bending of the metal terminal fitment 19 and soldering of the connection conductor 8 to the metal terminal fitment 19 while keeping insertion of the connection conductor 8 via the through-hole 23 externally observed, in the state that the metal terminal fitments 19 are kept supported on the pressure sensor element 3 and the circuit board 9 is kept supported on the connection conductors 8 of the connector 5. This facilitates assembling of the pressure sensor unit.

Figure 12:
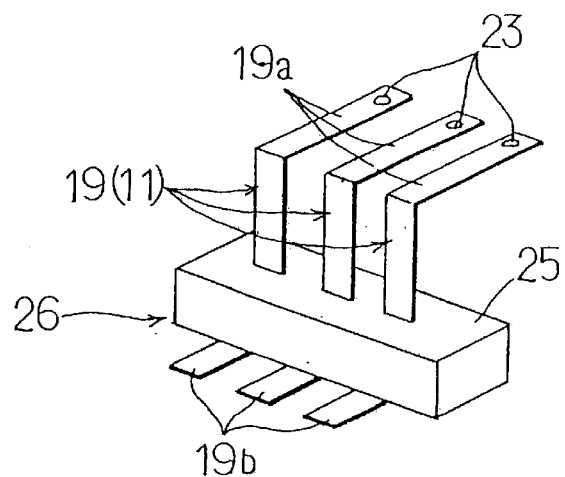
FIG. 12 is a perspective view showing another example of a metal terminal fitment incorporated in the capacitance-type pressure sensor unit shown in FIG. 10(A)

Referring now to FIG. 12, a modification of the metal terminal fitments 19 incorporated in the third embodiment of the capacitance-type pressure sensor unit described above is illustrated.

In the modification, a plurality of metal terminal fitments 19 are fixed on a single molded piece 25 made of an insulating resin material, resulting in being constructed into a terminal fitment unit 26. In the modification, three such terminal fitments 19 are arranged. More particularly, the metal terminal fitments 19 are insert-molded in the common molded piece 25, resulting in being formed into the terminal fitment unit 26.

In the terminal fitment unit 26, the metal terminal fitments 19 each include a first connection section 19a constructed in substantially the same manner as that shown in FIG. 11 and a second connection section 19b formed in a plate-like manner and bent in a direction parallel to a lower surface of the molded piece so as to facilitate surface mounting.

In the terminal fitment unit 26 thus constructed, the second connection sections 19b each are mounted on each of electrode sections incorporated in a first circuit pattern on a front surface of a second insulating substrate 2 of a pressure sensor element 3 for connection by soldering.

The terminal fitment unit 26 permits fixing of the metal terminal fitments 19 and electrical connection thereof to be efficiently carried out. Also, insert-molding of the metal terminal fitments in the molded piece 25 permits incorporation of the terminal fitments in the common molded piece 25 to be attained in a lump.

Figure 13A:
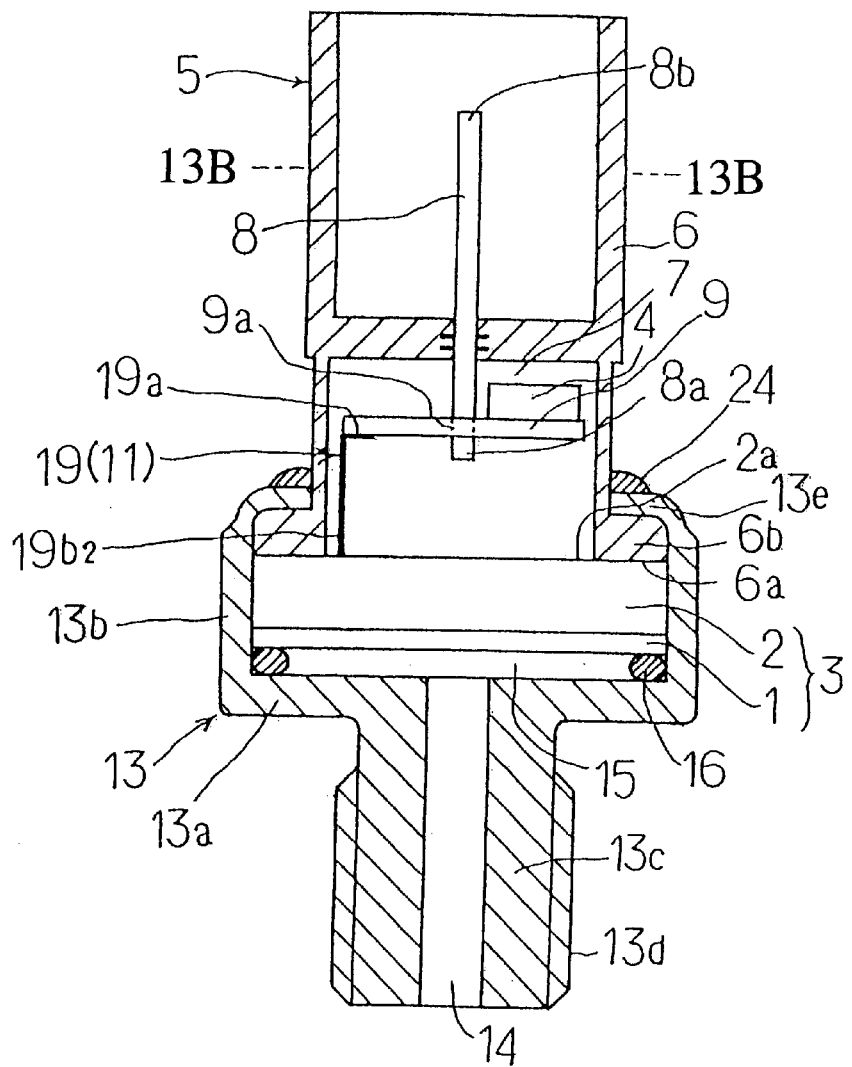
Figure 13B:
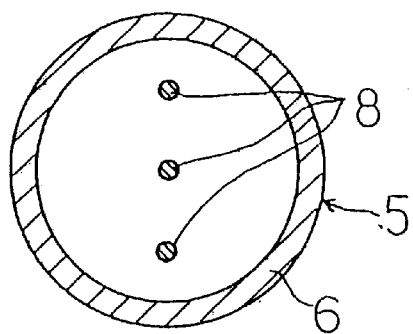

Referring now to FIGS. 13(A) and 13(B), a modification of the capacitance-type pressure sensor unit shown in FIG. 10 is illustrated, wherein FIG. 13(A) is a vertical sectional view of a pressure sensor unit of the modification and FIG. 13(B) is a sectional end view taken along line 13B—13B of FIG. 13(A).

The capacitance-type pressure sensor unit of the modification is so constructed that at least one electric circuit component 4 such as an integrated circuit or the like for processing an output of a pressure sensor element 3 is electrically connected to a circuit pattern (not shown) formed on a rear surface of a circuit board 9 by soldering. Thus, the electric circuit component 4 is not arranged on a front surface 2a of a second insulating substrate 2, unlike the pressure sensor unit of FIG. 10. The front surface 2a of the second insulating substrate 2 is formed thereon with output electrodes for the pressure sensor element 3 and metal terminal fitments 19 are arranged so as to electrically connect the output electrodes and the circuit patterns on the circuit board 9 to each other. Also, connection conductors 8 are arranged so as to be electrically connected to the circuit pattern on the circuit board 9. The remaining part of the modification may be constructed in substantially the same manner as the pressure sensor unit shown in FIG. 10.

INDUSTRIAL APPLICABILITY

The capacitance-type pressure sensor unit according to the present invention is so constructed that the circuit board is supported on at least one of a plurality of the connection conductors and a plurality of metal terminal fitments. This permits assembling of the pressure sensor unit to be carried out without applying a pressure at an increased level to the circuit board. Also, the pressure sensor element and the circuit patterns on the circuit board are electrically connected to each other through a plurality of the metal terminal fitments, so that electrical connection between the pressure sensor and the circuit patterns on the circuit board may be satisfactorily attained even when the circuit board is kept suspended in the circuit component receiving chamber.

What is claimed is:

1. A capacitance-type pressure sensor unit comprising:

a capacitance-type pressure sensor element including a first insulating substrate which is made of an insulating material and has a front surface provided thereon with a first capacitance detecting electrode pattern and a rear surface constituting a pressure sensing surface and a second insulating substrate which is made of an insulating material and fixed with respect to said first insulating substrate and has a rear surface provided thereon with a second capacitance detecting electrode pattern in a manner to be opposite to said first capacitance detecting electrode pattern while being spaced at an interval therefrom;

a receiving casing made of metal and including a cylindrical casing body provided at one end thereof with an opening and at the other end thereof with a bottom wall section, said bottom wall section being provided with a fluid inlet port through which a pressure measured fluid is introduced into said receiving casing;

a circuit board including a board member provided thereon with circuit patterns and mounted thereon with at least a part of a plurality of electric circuit components constituting a signal processing circuit for processing an output of said pressure sensor element; and a connector including a connector body which is made of an insulating material and includes a base formed on one surface thereof with an opening and provided therein with a circuit component receiving chamber for receiving said circuit board therein in a manner to communicate with said opening of said connector body;

said connector also including a plurality of connection conductors fixed in said connector body and each having one end extending into said circuit component receiving chamber and electrically connected to each of said circuit patterns on said circuit board and an other end externally exposed;

said circuit board having a component mounting surface arranged so as to extend along a front surface of said second insulating substrate of said pressure sensor element;

said pressure sensor element being received in said casing body of said receiving casing while keeping said pressure sensing surface facing said bottom wall section of said casing body;

said connector body being received in said casing body of said receiving casing in such a manner that said base of said connector body is positioned on a side of said opening of said receiving casing rather than on a side of said pressure sensor element;

said receiving casing being securely mounted at an end thereof positioned on a side of said opening of said connector body on said base of said connector body by caulking;

said pressure sensor element and said circuit patterns on said circuit board being electrically connected to each other through a plurality of metal terminal fitments;

said circuit board being supported by at least one of said connection conductors of said connector and said metal terminal fitments.

2. A capacitance-type pressure sensor unit comprising:

a capacitance-type pressure sensor element including a first insulating substrate which is made of an insulating material and has a front surface provided thereon with a first capacitance detecting electrode pattern and a rear surface constituting a pressure sensing surface and a second insulating substrate which is made of an insulating material and fixed with respect to said first insulating substrate and has a rear surface provided thereon with a second capacitance detecting electrode pattern in a manner to be opposite to said first capacitance detecting electrode pattern while being spaced at an interval therefrom;

a receiving casing made of metal and including a cylindrical casing body provided at one end thereof with an opening and at the other end thereof with a bottom wall section, said bottom wall section being provided with a fluid inlet port through which a pressure measured fluid is introduced into said receiving casing;

a circuit board including a board member provided thereon with circuit patterns and mounted thereon with at least a part of a plurality of electric circuit components constituting a signal processing circuit for processing an output of said pressure sensor element; and a connector including a connector body which is made of an insulating material and includes a base formed on one surface thereof with an opening and provided therein with a circuit component receiving chamber for receiving said circuit board therein in a manner to communicate with said opening of said base;

said connector also including a plurality of connection conductors fixed in said connector body and each having one end extending into said circuit component receiving chamber and electrically connected to each of said circuit patterns on said circuit board and the other end externally exposed;

said circuit board having a component mounting surface arranged so as to extend along a front surface of said second insulating substrate of said pressure sensor element;

said pressure sensor element being received in said casing body of said receiving casing while keeping said pressure sensing surface facing said bottom wall section of said casing body;

said connector body being received in said casing body of said receiving casing in such a manner that said base of said connector body is positioned on a side of said opening of said receiving casing rather than on a side of said pressure sensor element;

said receiving casing being securely mounted at an end thereof positioned on a side of said opening of said connector body on said base of said connector body by caulking;

said pressure sensor element including a plurality of output electrodes electrically connected to said circuit patterns on said circuit board by means of a plurality of metal terminal fitments;

said circuit board being supported by at least said connection conductors of said connector and said metal terminal fitments.

3. A capacitance-type pressure sensor unit as defined in claim 1, wherein said circuit patterns include a ground electrode connected to said receiving casing;

said ground electrode and said receiving casing being electrically connected to each other through a ground terminal fitment made of metal;

said ground terminal fitment being arranged so as to support said circuit board.

4. A capacitance-type pressure sensor unit comprising:

a capacitance-type pressure sensor element including a first insulating substrate which is made of an insulating material and has a front surface provided thereon with a first capacitance detecting electrode pattern and a rear surface constituting a pressure sensing surface and a second insulating substrate which is made of an insulating material and fixed with respect to said first insulating substrate and has a rear surface provided thereon with a second capacitance detecting electrode pattern in a manner to be opposite to said first capacitance detecting electrode pattern while being spaced at an interval therefrom;

said capacitance-type pressure sensor unit detecting a variation in pressure acting on said pressure sensing surface of said first insulating substrate depending on a variation in capacitance between said first capacitance detecting electrode pattern and said second capacitance detecting electrode pattern;

a receiving casing made of metal and including a cylindrical casing body provided at one end thereof with an opening and at the other end thereof with a bottom wall section, said bottom wall section being provided with a fluid inlet port through which a pressure measured fluid is introduced into said receiving casing;

a circuit board including a board member provided thereon with circuit patterns and mounted thereon with at least a part of a plurality of electric circuit components constituting a signal processing circuit for processing an output of said pressure sensor element; and a connector including a connector body which is made of an insulating material and includes a base formed on one surface thereof with an opening and provided therein with a circuit component receiving chamber for receiving said circuit board therein in a manner to communicate with said opening of said connector body;

said connector also including a plurality of connection conductors fixed in said connector body and each having one end extending into said circuit component receiving chamber and electrically connected to each of said circuit patterns on said circuit board and the other end externally exposed;

said circuit board having a component mounting surface arranged so as to extend along a front surface of said second insulating substrate of said pressure sensor element;

said pressure sensor element being received in said casing body of said receiving casing so that a fluid chamber which fluid introduced through said fluid inlet port enters may be defined between said pressure sensing surface and said bottom wall section of said receiving casing;

said connector body being received in said casing body of said receiving casing in such a manner that said base of said connector body is kept contacted at an end thereof on a side of said opening of said base with a front surface of said second insulating substrate of said pressure sensor element;

said receiving casing being securely mounted at an end thereof positioned on a side of said opening of said connector body on said base of said connector body by caulking;

said pressure sensor element and said circuit patterns on said circuit board being electrically connected to each other through a plurality of metal terminal fitments;

said circuit patterns including a ground electrode connected to said receiving casing;

said ground electrode and receiving casing being electrically connected to each other through a ground terminal fitment made of metal;

said circuit board being supported by said connection conductors of said connector, said metal terminal fitments and said ground terminal fitment.

5. A capacitance-type pressure sensor unit as defined in claim 3 or 4, wherein said metal terminal fitments each include a first section having one end connected to the electrode included in said circuit patterns of said circuit board by soldering and the other end fixed to a portion of a wall of said connector body which surrounds said circuit component receiving chamber and is opposite to said circuit board, as well as a second section having one end formed integrally with said first section and the other end connected to each of output electrodes of said pressure sensor element by soldering;

said second section being formed at a portion thereof between said one end thereof and said the other end thereof into a shape which permits said second section to exhibit elasticity.

6. A capacitance-type pressure sensor unit as defined in claim 3 or 4, wherein said ground terminal fitment includes a first section having one end connected to the electrode included in said circuit patterns of said circuit board by soldering and the other end fixed to a portion of a wall of said connector body which surrounds said circuit component receiving chamber and is opposite to said circuit board, as well as a second section having one end formed integrally with said first section and the other end contacted with an inner surface of said receiving casing;

said second section being formed at a portion thereof between said one end thereof and said the other end thereof into a shape which permits said second section to exhibit elasticity.

7. A capacitance-type pressure sensor unit as defined in claim 3 or 4, wherein said first insulating substrate of said pressure sensor element is formed into a contour of a substantially circular shape in plan;

said second insulating substrate of said pressure sensor element is formed on a side wall section thereof with a flat section on which a plurality of output electrodes are arranged; and said second insulating substrate of said pressure sensor element is formed at a portion of said side wall section thereof opposite to said flat section with a recess in which said the other end of said ground terminal fitment is fitted.

8. A capacitance-type pressure sensor unit as defined in claim 2 or 4, wherein said casing body of said receiving casing is formed on an inner surface thereof with an annular casing-side step; and said base of said connector body is formed on an outer periphery thereof with an annular connector-side step;

said annular casing-side step and connector-side step having a waterproof O-ring arranged therebetween while keeping said O-ring compressed.

9. A capacitance-type pressure sensor unit as defined in claim 4, wherein said end of said connector body is integrally provided with two or more projections; and said front surface of said second insulating substrate is formed with two or more recesses in which said projections are fitted.

10. A capacitance-type pressure sensor unit comprising:

a pressure sensor element including a first insulating substrate having a front surface provided thereon with an electrode and a rear surface acting as a pressure sensing surface and a second insulating substrate which has a rear surface provided thereon with an electrode in a manner to be opposite to said electrode on said first insulating substrate while being spaced at a predetermined interval therefrom and is combined with said first insulating substrate;

a plurality of output electrodes formed on one of a front surface of said second insulating substrate and a side surface thereof and electrically connected to said electrodes;

at least one electric circuit component for processing an output of said pressure sensor element;

a connector including a connector body which is made of an insulating resin material and includes a base having an end surface contacted with said front surface of said second insulating substrate of said pressure sensor element and provided therein with a circuit component receiving chamber for receiving said electric circuit component therein;

said connector also including a plurality of connection conductors supported in said connector body and each having one end positioned in said circuit component receiving chamber and an other end externally exposed;

a circuit board arranged in said circuit component receiving chamber while being kept spaced from said front surface of said second insulating substrate and including circuit patterns electrically connected to said output electrodes and connection conductors;

electrical connection means for electrically connecting said circuit board and output electrodes to each other; and a receiving casing made of metal and including a bottom wall section formed with-a fluid inlet port for introducing pressure measured fluid therethrough and a peripheral wall section connected at one end thereof to said bottom wall section;

said receiving casing receiving said pressure sensor element and at least a part of said base of said connector body therein so that a fluid chamber which said pressure measured fluid enters may be defined between said pressure sensing surface of said pressure sensor element and said bottom wall section;

said circuit board being supported on a circuit board support structure fixed on said second insulating substrate of said pressure sensor element;

said circuit board support structure acting also as said electrical connection means.

11. A capacitance-type pressure sensor unit as defined in claim 10, wherein said circuit patterns of said circuit board and said connection conductors are electrically connected to each other through lead wires.

12. A capacitance-type pressure sensor unit as defined in claim 10 or 11, wherein said circuit board support structure is constituted by three or more metal terminal fitments each formed by subjecting a metal plate to machining;

said terminal fitments each being provided at one end thereof with a first connection section which is fixed on said circuit board and connected to an electrode section included in said circuit patterns by soldering as required and at the other end thereof with a second connection section which is fixed with respect to said second insulating substrate of said pressure sensor element and connected to each of said output electrodes by soldering.

13. A capacitance-type pressure sensor unit as defined in claim 12, wherein said front surface of said second insulating substrate of said pressure sensor element is formed with a plurality of fit holes in each of which said second connection section of each of said metal terminal fitments is tightly fitted;

said second connection section of each of said metal terminal fitments including a fit portion fitted in each of said fit holes and a soldered portion arranged so as to extend along said front surface of said second insulating substrate and connected to said electrode section.

14. A capacitance-type pressure sensor unit as defined in claim 12 or 13, wherein said first connection section of said metal terminal fitment is constructed so as to interposedly support said circuit board in a direction of thickness thereof.

15. A capacitance-type pressure sensor unit comprising:

a pressure sensor element including a first insulating substrate having a front surface provided thereon with an electrode and a rear surface acting as a pressure sensing surface and a second insulating substrate which has a rear surface provided thereon with an electrode in a manner to be opposite to said electrode on said first insulating substrate while being spaced at a predetermined interval therefrom and is combined with said first insulating substrate;

a first circuit pattern formed on a front surface of said second insulating substrate and electrically connected to said electrodes;

at least one electric circuit component arranged on said front surface of said second insulating substrate and electrically connected to said first circuit pattern, resulting in processing an output of said pressure sensor element;

a connector including a connector body which is made of an insulating resin material and includes a base having an end surface contacted with said front surface of said second insulating substrate of said pressure sensor element and provided therein with a circuit component receiving chamber for receiving said electric circuit component therein;

said connector also including a plurality of connection conductors supported in said connector body and each having one end positioned in said circuit component receiving chamber and the other end externally exposed;

a circuit board arranged in said circuit component receiving chamber while being kept spaced from said front surface of said second insulating substrate and including a second circuit pattern electrically connected to said first circuit pattern and connection conductors;

electrical connection means for electrically connecting said circuit board and first circuit pattern to each other; and a receiving casing made of metal and including a bottom wall section formed with a fluid inlet port for introducing pressure measured fluid therethrough and a peripheral wall section connected at one end thereof to said bottom wall section;

said receiving casing receiving said pressure sensor element and at least a part of said base of said connector body therein so that a fluid chamber which said pressure measured fluid enters may be defined between said pressure sensing surface of said pressure sensor element and said bottom wall section;

said circuit board being supported on a circuit board support structure fixed on said second insulating substrate of said pressure sensor element;

said circuit board support structure acting also as said electrical connection means.

16. A capacitance-type pressure sensor unit comprising:

a pressure sensor element including a first insulating substrate having a front surface provided thereon with an electrode and a rear surface acting as a pressure sensing surface and a second insulating substrate which has a rear surface provided thereon with an electrode in a manner to be opposite to said electrode on said first insulating substrate while being spaced at a predetermined interval therefrom and is combined with said first insulating substrate;

a plurality of output electrodes formed on one of a front surface of said second insulating substrate and a side surface thereof and electrically connected to said electrodes;

at least one electric circuit component for processing an output of said pressure sensor element;

a connector including a connector body which is made of an insulating resin material and includes a base having an end surface contacted with said front surface of said second insulating substrate of said pressure sensor element and provided therein with a circuit component receiving chamber for receiving said electric circuit component therein;

said connector also including a plurality of connection conductors supported in said connector body and each having one end positioned in said circuit component receiving chamber and the other end externally exposed;

a circuit board arranged in said circuit component receiving chamber while being kept spaced from said front surface of said second insulating substrate and including circuit patterns electrically connected to said output electrodes and connection conductors;

electrical connection means for electrically connecting said circuit patterns and output electrodes to each other; and a receiving casing made of metal and including a bottom wall section formed with a fluid inlet port for introducing pressure measured fluid therethrough and a peripheral wall section connected at one end thereof to said bottom wall section;

said circuit board being formed with a plurality of through-holes through which said connection conductors are inserted at a distal end thereof, resulting in being supported by said distal end of each of said connection conductors;

said electrical connection means including a plurality of metal terminal fitments each formed by subjecting a flexible metal plate to machining;

said terminal fitments each being provided at one end thereof with a first connection section formed with through-holes through which said connection conductors are inserted at said distal end thereof and connected to said distal end by soldering and at the other end thereof with a second connection section which is fixed with respect to said second insulating substrate of said pressure sensor element and connected to each of said output electrodes by soldering.

17. A capacitance-type pressure sensor unit as defined in claim 16, wherein said front surface of said second insulating substrate of said pressure sensor element is formed with a plurality of fit holes in each of which said second connection section of each of said metal terminal fitments is tightly fitted;

said second connection section of each of said metal terminal fitments including a fit portion fitted in each of said fit holes and a soldered portion arranged so as to extend along said front surface of said second insulating substrate and connected to said electrode section.

18. A capacitance-type pressure sensor unit as defined in claim 16 or 17, wherein said metal terminal fitments are fixed on a single molded piece made of an insulating resin material.

19. A capacitance-type pressure sensor unit as defined in claim 18, wherein said metal terminal fitments are insert-molded in said molded piece.

20. A capacitance-type pressure sensor unit comprising:

a pressure sensor element including a first insulating substrate having a front surface provided thereon with an electrode and a rear surface acting as a pressure sensing surface and a second insulating substrate which has a rear surface provided thereon with an electrode in a manner to be opposite to said electrode on said first insulating substrate while being spaced at a predetermined interval therefrom and is combined with said first insulating substrate;

a first circuit pattern formed on a front surface of said second insulating substrate and electrically connected to said electrodes;

at least one electric circuit component arranged on the front surface of said second insulating substrate and electrically connected to said first circuit pattern, resulting in processing an output of said pressure sensor element;

a connector including a connector body which is made of an insulating resin material and includes a base having an end surface contacted with said front surface of said second insulating substrate of said pressure sensor element and provided therein with a circuit component receiving chamber for receiving said electric circuit component therein;

said connector also including a plurality of connection conductors supported in said connector body and each having one end positioned in said circuit component receiving chamber and an other end externally exposed;

a circuit board arranged in said circuit component receiving chamber while being kept spaced from said front surface of said second insulating substrate and including a second circuit pattern electrically connected to said first circuit pattern and connection conductors;

electrical connection means for electrically connecting said circuit board and first circuit pattern to each other; and a receiving casing made of metal and including a bottom wall section formed with a fluid inlet port for introducing pressure measured fluid therethrough and a peripheral wall section connected at one end thereof to said bottom wall section;

said receiving casing receiving said pressure sensor element and at least a part of said base of said connector body therein so that a fluid chamber which said pressure measured fluid enters may be defined between said pressure sensing surface of said pressure sensor element and said bottom wall section;

said circuit board being formed with a plurality of through-holes via which said connection conductors are inserted at a distal end thereof, resulting in being supported by said distal end of each of said connection conductors;

said electrical connection means including a plurality of metal terminal fitments each formed by subjecting a flexible metal plate to machining;

said terminal fitments each being provided at one end thereof with a first connection section formed with through-holes via which said connection conductors are inserted at said distal end thereof and connected to said distal end by soldering and at the other end thereof with a second connection section which is fixed with respect to said second insulating substrate of said pressure sensor element and connected to an electrode section included in said first circuit pattern by soldering.

* * * * *

UNITED STATES PATENT AND TRADEMARK OFFICE
CERTIFICATE OF CORRECTION

PATENT NO. : 6,212,955 B1
DATED : April 10, 2001
INVENTOR(S) : Tanaka et al.

It is certified that error appears in the above-identified patent and that said Letters Patent is hereby corrected as shown below:

Column 9,
Line 23, delete "sectional" and insert -- bottom --.

Column 26,
Line 38, delete "with-a" and insert -- with a --.

Column 30,
Line 26, delete "via" and insert -- through --.
Line 35, delete "via" and insert -- through --.

Signed and Sealed this

Eighteenth Day of December, 2001

Attest:

JAMES E. ROGAN
Attesting Officer
Director of the United States Patent and Trademark Office